(12) United States Patent
Abe

(10) Patent No.: US 8,103,124 B2
(45) Date of Patent: Jan. 24, 2012

(54) REGISTRATION APPARATUS, REGISTRATION METHOD AND PROGRAM

(75) Inventor: Hiroshi Abe, Tokyo (JP)

(73) Assignee: Sony Corporation, Tokyo (JP)

( * ) Notice: Subject to any disclaimer, the term of this patent is extended or adjusted under 35 U.S.C. 154(b) by 974 days.

(21) Appl. No.: 11/934,888

(22) Filed: Nov. 5, 2007

(65) Prior Publication Data

US 2008/0144889 A1 Jun. 19, 2008

(30) Foreign Application Priority Data

Dec. 15, 2006 (JP) ................. P2006-339058

(51) Int. Cl.
*G06K 9/36* (2006.01)
(52) U.S. Cl. ...................... 382/276; 382/151
(58) Field of Classification Search .............. D14/480.4; 340/5.52, 5.82; 382/115, 276, 151; 713/186; 902/3; 226/2, 3, 27, 45; 348/263, 745; 399/301, 399/372, 394; 430/22; 700/57, 124
See application file for complete search history.

(56) References Cited

U.S. PATENT DOCUMENTS 7,809,168 B2 * 10/2010 Abiko et al. .................. 382/115

FOREIGN PATENT DOCUMENTS

| JP | 04-336677 | | 11/1992 |
|---|---|---|---|
| JP | 10-031745 | | 2/1998 |
| JP | 10-0311745 | * | 2/1998 |
| JP | 2003-331272 | | 11/2003 |
| JP | 2005-253989 | * | 9/2005 |
| JP | 2006-207033 | | 8/2006 |
| JP | 2006-309656 | * | 11/2006 |

OTHER PUBLICATIONS

Buzug et al., "Automatic image analysis method" Machine translation of JP 10-031745.
Hideo, "Authentication device registration method collating method and program" Machine transation of JP 2006-309656.
Office Action issued May 24, 2011, for Japanese Patent Application No. 2006-339058.

* cited by examiner

*Primary Examiner* — Gregory F Cunningham
(74) *Attorney, Agent, or Firm* — Finnegan, Henderson, Farabow, Garrett & Dunner, L.L.P.

(57) ABSTRACT

A registration apparatus includes: a calculation section that calculates a positional difference between a part of a physical trait on a first image that is processed and a corresponding part of the physical trait on a second image that was processed earlier than the first image, the physical trait being used for verification; a connecting section that connects the first image to the second image after correcting, in accordance with the calculated positional difference, the position of the first image such that a part of the physical trait on the first image is overlapped with a corresponding part of the physical trait on the second image; and a registration section that registers the connected image in a storage medium.

7 Claims, 23 Drawing Sheets

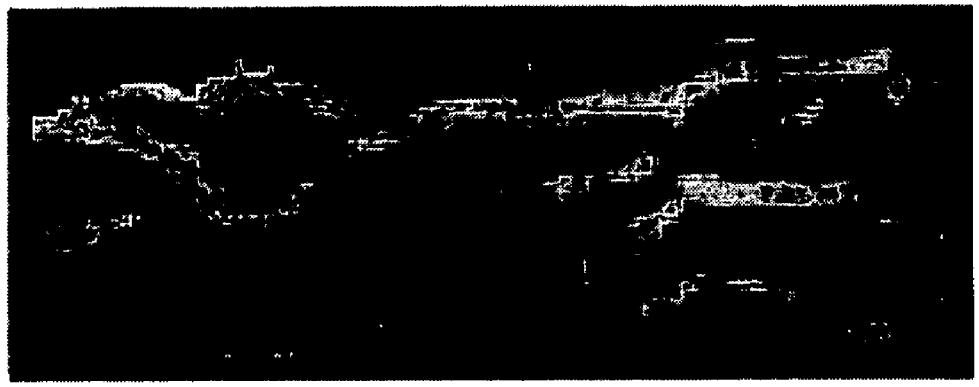
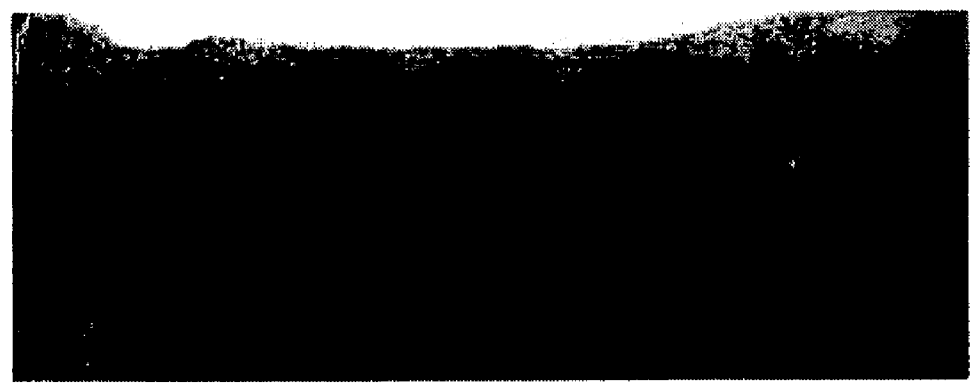

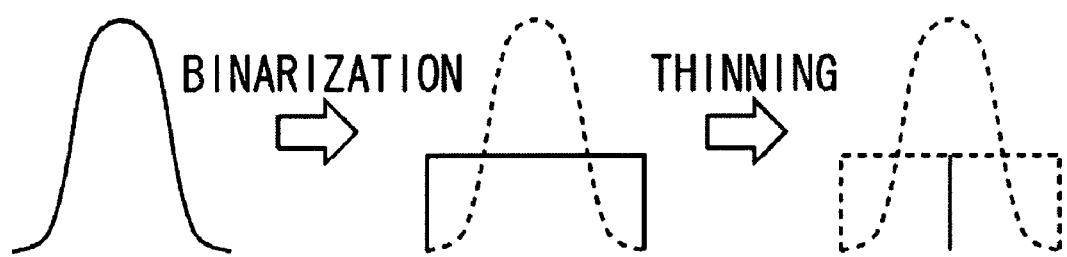
FIG. 13
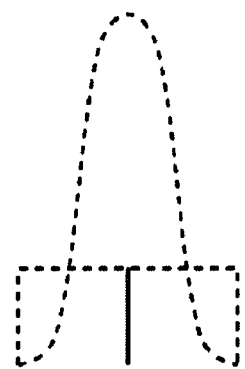 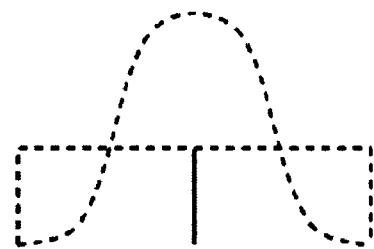
FIG. 14A          FIG. 14B

REGISTRATION APPARATUS, REGISTRATION METHOD AND PROGRAM

CROSS REFERENCES TO RELATED APPLICATIONS

The present invention contains subject matter related to Japanese Patent Application JP2006-339058 filed in the Japanese Patent Office on Dec. 15, 2006, the entire contents of which being incorporated herein by reference.

BACKGROUND OF THE INVENTION

1. Field of the Invention

The present invention relates to a registration apparatus, registration method and program, and is preferably applied to biometric verification, for example.

2. Description of the Related Art

Biometric verification is used to identify a user based on his/her physical traits. One of the traits is a finger's blood vessel pattern.

As disclosed in Jpn. Pat. Laid-open Publication No. 2003-331272, there is an authentication apparatus that includes a turntable 7. An image pickup camera 2 and a light source 1 are placed on either side of the turntable 7. A user puts his/her finger 3 on the center axis of the turntable 7. The authentication apparatus spins the turntable 7 at constant speed to rotate the image pickup camera 2 and the light source 1 around the finger 3 and takes moving images. The authentication apparatus uses those images to grasp all the sides of the finger. The authentication apparatus can therefore identify a user precisely.

SUMMARY OF THE INVENTION

Since it has the turntable that rotates around a finger, the above authentication apparatus is larger than an authentication apparatus including a fixed image pickup camera that periodically shoots a finger rolling on a predetermined position to take pictures of all the sides of the finger.

On the other hand, if the authentication apparatus including the fixed image pickup camera is used, the finger may tilt due to the rotation. In addition, the finger may sink downward depending on how hard the user pushes down on it with the finger or the like. This does not provide precise images for verification.

If the authentication apparatus is equipped with an insertion hole or the like to immobilize a finger, it may prevent tilting of the finger. However, that is not enough to fix the position of the finger. In addition, the authentication apparatus becomes larger due to the insertion hole or the like.

The present invention has been made in view of the above points and is intended to provide a registration apparatus, registration method and program that can precisely identify a user and can be downsized.

In one aspect of the present invention, a registration apparatus includes: a calculation section that calculates a positional difference between a part of a physical trait on a first image that is processed and a corresponding part of the physical trait on a second image that was processed earlier than is the first image, the physical trait being used for verification; a connecting section that connects the first image to the second image after correcting, in accordance with the calculated positional difference, the position of the first image such that a part of the physical trait on the first image is overlapped with a corresponding part of the physical trait on the second image; and a registration section that registers the connected image in a storage medium.

In that manner, the registration apparatus connects the first image to the second image after correcting, in accordance with the calculated positional difference, the position of the first image such that a part of the physical trait on the first image is overlapped with a corresponding part of the physical trait on the second image. Accordingly, a user does not have to insert his/her finger into a guiding hole or the like. Instead, a user rolls his/her finger on the surface of a fixed camera. In addition, the apparatus can correct the horizontal and vertical positional difference of a finger.

In another aspect of the present invention, a registration method includes: a first step of calculating a positional difference between a part of a physical trait on a first image that is processed and a corresponding part of the physical trait on a second image that is processed earlier than is the first image, the physical trait being used for verification; a second step of connecting the first image to the second image after correcting, in accordance with the calculated positional difference, the position of the first image such that a part of the physical trait on the first image is overlapped with a corresponding part of the physical trait on the second image; and a third step of registering the connected image in a storage medium.

In that manner, the registration method connects the first image to the second image after correcting, in accordance with the calculated positional difference, the position of the first image such that a part of the physical trait on the first image is overlapped with a corresponding part of the physical trait on the second image. Accordingly, a user does not have to insert his/her finger into a guiding hole or the like. Instead, a user rolls his/her finger on the surface of a fixed camera. In addition, the apparatus can correct the horizontal and vertical positional difference of a finger.

In another aspect of the present invention, a program for causing a computer to execute: a step of calculating a positional difference between a part of a physical trait on a first image that is processed and a corresponding part of the physical trait on a second image that is processed earlier than is the first image, the physical trait being used for verification; a step of connecting the first image to the second image after correcting, in accordance with the calculated positional difference, the position of the first image such that a part of the physical trait on the first image is overlapped with a corresponding part of the physical trait on the second image; and a step of registering the connected image in a storage medium.

In that manner, the program connects the first image to the second image after correcting, in accordance with the calculated positional difference, the position of the first image such that a part of the physical trait on the first image is overlapped with a corresponding part of the physical trait on the second image. Accordingly, a user does not have to insert his/her finger into a guiding hole or the like. Instead, a user rolls his/her finger on the surface of a fixed camera. In addition, the apparatus can correct the horizontal and vertical positional difference of a finger.

In that manner, the registration apparatus, the registration method and the program thereof connect the first image to the second image after correcting, in accordance with the calculated positional difference, the position of the first image such that a part of the physical trait on the first image is overlapped with a corresponding part of the physical trait on the second image. Accordingly, a user does not have to insert his/her finger into a guiding hole or the like. Instead, a user rolls his/her finger on the surface of a fixed camera. In addition, the registration apparatus, the registration method and the program thereof can correct the horizontal and vertical positional difference of a finger. Thus, the registration apparatus, the registration method and the program thereof can be downsized and can verify a user precisely.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 5A and 5B are schematic diagrams illustrating images before and after embossment;

FIG. 13 is a schematic diagram illustrating the change of brightness during a pattern extraction process;

FIGS. 14A and 14B are schematic diagrams illustrating how to average the brightness;

DETAILED DESCRIPTION OF PREFERRED EMBODIMENTS

An embodiment of the present invention will be described in detail with reference to the accompanying drawings.

(1) Overall Configuration of an Authentication Apparatus

Figure 1:
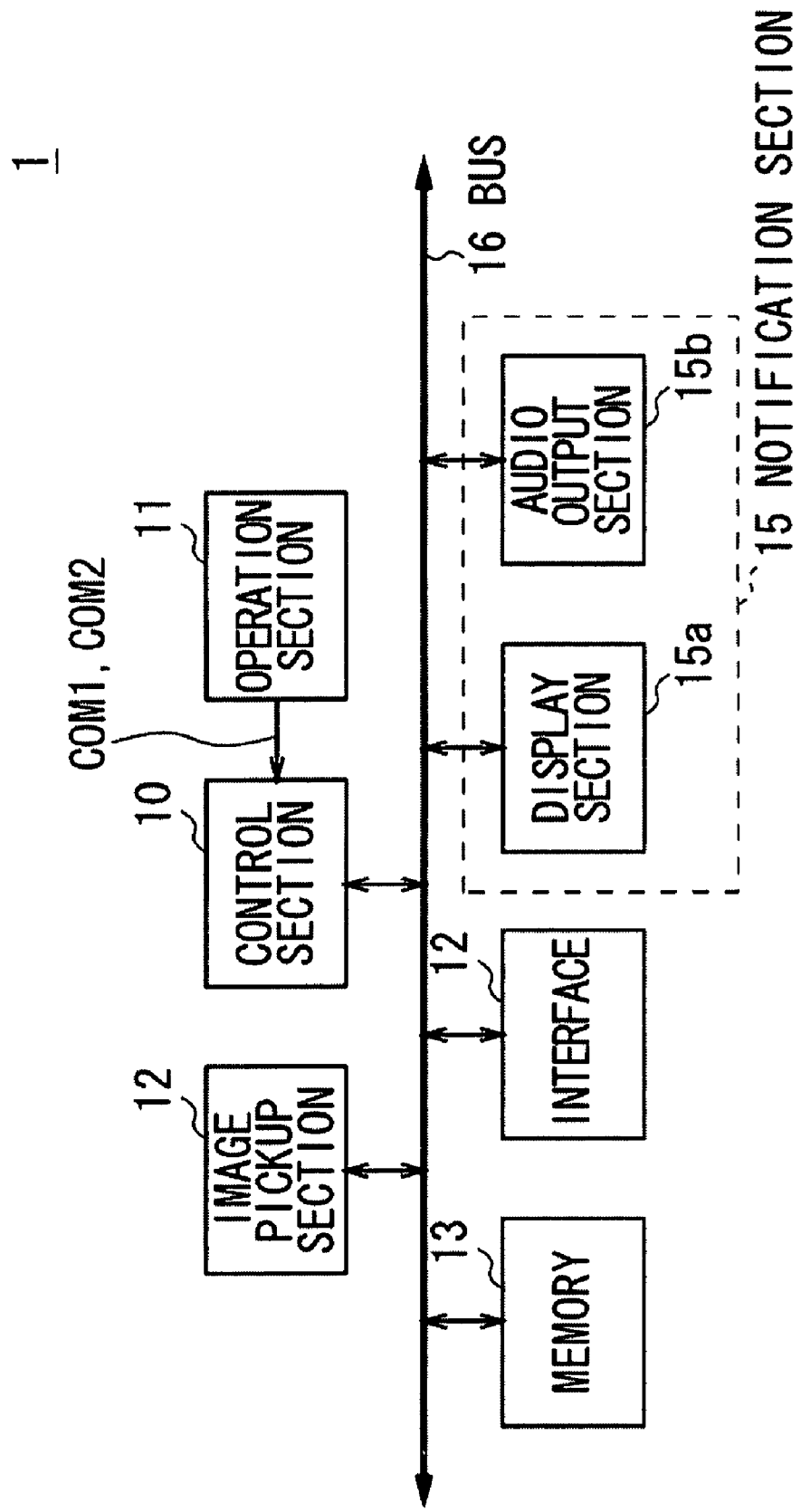
FIG. 1 is a block diagram illustrating the overall configuration of an authentication apparatus according to an embodiment of the present invention.
Figure 2A:
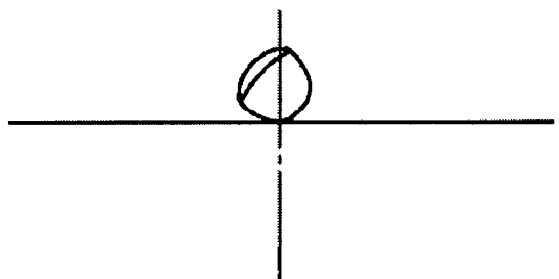
FIGS. 2A to 2E are schematic diagrams illustrating a finger that is rolling on a surface.
Figure 2B:
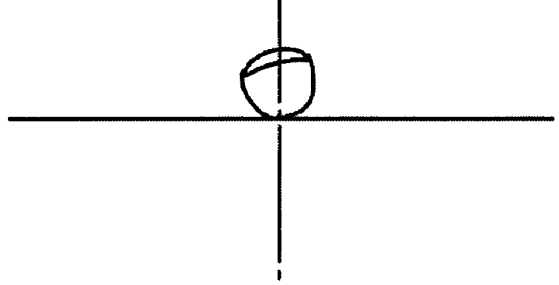
Figure 2C:
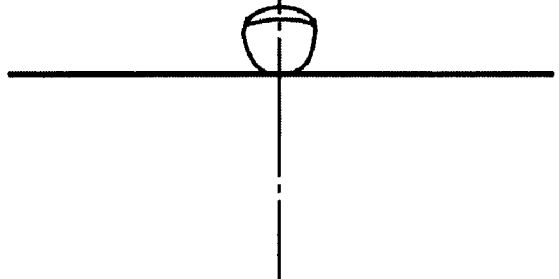
Figure 2D:
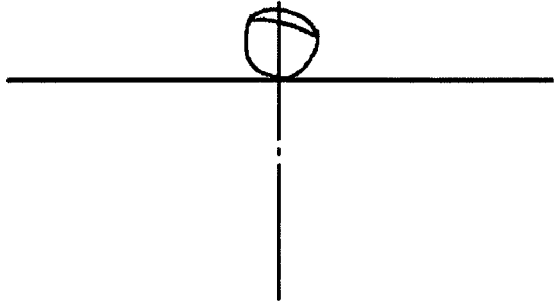
Figure 2E:
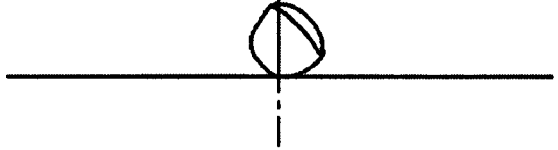

FIG. 1 illustrates the overall configuration of an authentication apparatus 1 according to an embodiment of the present invention. The authentication apparatus 1 includes a control section 10 that is connected to an operation section 11, an image pickup section 12, a memory 13, an interface 14 and a notification section 15 via a bus 16.

The control section 10 is a microcomputer including a central processing unit (CPU), which takes overall control of the apparatus 1, a read only memory (ROM), which stores various programs and setting information, and a random access memory (RAM), which serves as a work memory for the CPU.

When operated by a user, the operation section 11 supplies a command COM1, COM2 or the like to the control section 10: The command COM1 orders the control section 10 to operate in blood vessel registration mode for registering a user's blood vessel pattern while the command COM2 orders the control section 10 to operate in authentication mode for identifying a user.

When receiving the command COM1 or COM2, the control section 10 operates in the blood vessel registration mode or the authentication mode. In this case, the control section 10 executes a corresponding program to control the image pickup section 12, the memory 13, the interface 14 and the notification section 15.

Based on an Exposure Value (EV) set by the control section 10, the image pickup section 12 adjusts a position of an optical lens of an optical system, aperture and a shutter speed (exposure time) of an image pickup element.

The image pickup section 12 controls the image pickup element to take images. The image pickup element sequentially outputs image signals at predetermined intervals. The image pickup section 12 performs an analog-to-digital (A/D) conversion process to convert the image signals into digital image data and then supplies the image data to the control section 10.

In addition, during a period of time specified by the control section 10, the image pickup section 12 drives an near infrared ray source to emit a near infrared ray to a predetermined position (also referred to as a "shooting position") where a shooting object is placed. The near infrared ray is particularly absorbed in blood vessels.

When a body part is placed at the shooting position, the emitted near infrared ray gets into the body part. After passing through the optical system and lens, the near infrared ray is received by the image pickup element, representing a blood vessel pattern of the body part. As a result, an image of the blood vessel pattern is formed on an image pickup surface of the image pickup element. In that manner, the image pickup section 12 obtains an image representing the blood vessels pattern.

The memory 13 is for example a flash memory. The memory 13 stores data specified by the control section 10. The control section 10 can read out the data from the memory 13.

The interface 14 exchanges data with external devices via a predetermined transmission line.

The notification section 15 includes: a display section 15a, which displays characters, symbols and the like based on data supplied from the control section 10; and an audio output section 15b, which outputs sound from a speaker based on data supplied from the control section 10.

(2) Blood Vessel Registration Mode

Following describes how the apparatus operates in the blood vessel registration mode. When receiving the command COM1, the control section 10 enters the blood vessel registration mode. The notification section 15 informs a user that he/she should put his/her finger on the shooting position such that the finger pad touches its surface and then roll his/her finger on the surface. In addition, the control section 10 begins operating the image pickup section 12.

Figure 3:
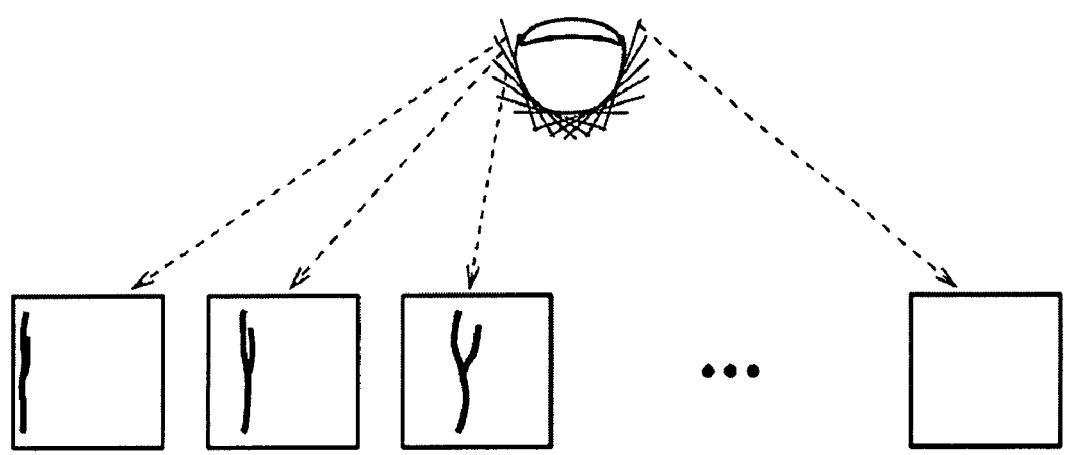
FIG. 3 is a schematic diagram illustrating image-pickup surfaces and blood vessels' images.

For example, when the user rolls his/her finger on the surface at the shooting position as shown in FIGS. 2A to 2E, the image pickup section 12 takes pictures of the blood vessels inside the finger from different angles as show in FIG. 3.

In this embodiment, the apparatus does not have any equipment to fix the position of a finger. Accordingly, when the apparatus takes pictures of the finger's blood vessels, a position where the user puts and rolls his/her finger may differ for each time. In addition, the distance from the surface to the blood vessels may vary depending on how hard the user presses his/her finger against the surface, its rotational axis and the like.

The control section 10 receives from the image pickup section 12 (image pickup element) the image data or the pictures of the finger of different angles. The control section 10 combines those pictures as one image. In addition, the control section 10 extracts feature points of the blood vessels from the image. The control section 10 subsequently stores or registers the image and the extracted feature points in the memory 13 as registration data.

In that manner, the control section 10 operates in the blood vessel registration mode.

Figure 4:
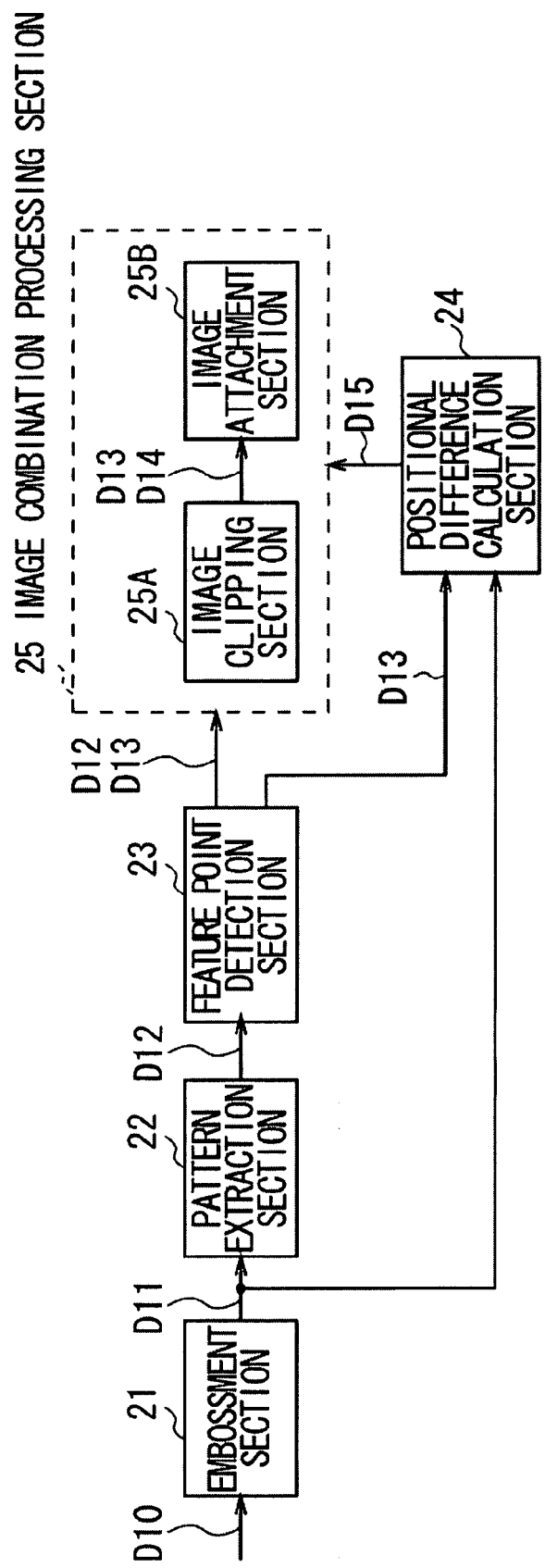
FIG. 4 is a block diagram illustrating the functional configuration of a control section (Blood vessel registration mode)

Following describes how the control section 10 obtains the image data and produces the registration data. Assume that the control section 10 has functional components as shown in FIG. 4, including an embossment section 21, a pattern extraction section 22, a feature point detection section 23, a positional difference calculation section 24 and an image combination processing section 25.

The embossment section 21 receives a stream of images of the finger of different angles (i.e. image data) from the image pickup section 12. Before being received by the embossment section 21, the stream of images may be thinned out at certain intervals (This process is also referred to as a "thin-out process").

(2-1) Embossment Process

The embossment section 21 embosses a pattern of blood vessels on the images. The embossment section 21, which receives image data D10, processes the image data D10 (such as a differential filtering process known as Gaussian) to emboss a pattern of blood vessels on the images. The embossment section 21 subsequently supplies to the pattern extraction section 22 and the positional difference calculation section 24 image data D11 of embossed blood vessel pattern images.

FIGS. 5A and 5B show images before and after embossment. As shown in FIG. 5A, a non-embossed image has obscure outlines of the blood vessel patterns. On the other hand, as shown in FIG. 5B, an embossed image has clear outlines of the blood vessel patterns. The embossment process of the embossment section 21 emphasizes the outlines of blood vessels. Accordingly, the blood vessel patterns can be distinguished from the remaining part of the image.

(2-2) Pattern Extraction Process

The pattern extraction section 22 extracts a pattern of blood vessels on the image as a pattern of lines. In this embodiment, the pattern extraction section 22, which receives the image data D11, binarizes the image data D11 and then extracts from the binarized image data a center of the width of the blood vessels and a brightness peak of the width to obtain a pattern of lines (also referred to as a "blood vessel line"). The pattern extraction section 22 subsequently supplies to the feature point detection section 23 image data D12 of blood vessel lines.

Figure 6:
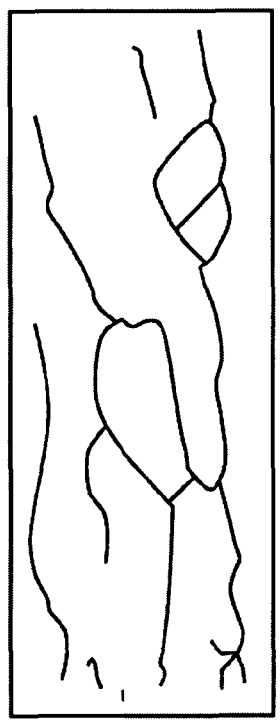
FIG. 6 is a schematic diagram illustrating extracted patterns.

As shown in FIG. 6, the pattern extraction process of the pattern extraction section 22 simplifies the blood vessel patterns, expressing them by lines.

(2-3) Feature Points Detection Process

Figure 7:
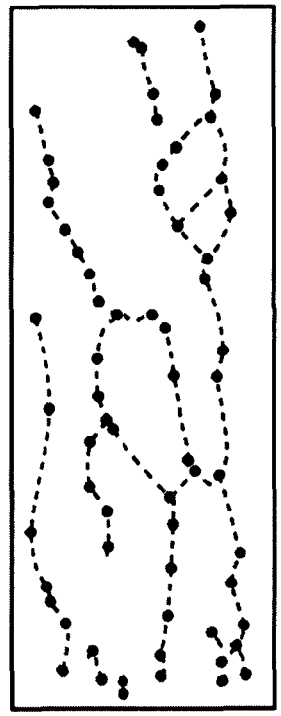
FIG. 7 is a schematic diagram illustrating feature points detected.

The feature point detection section 23 detects some of the junction points, endpoints, and turning points of the lines (or the line-shaped pattern) as feature points. In this embodiment, the feature point detection section 23, which receives the image data D12, detects from the image data D12 some of the end points, junction points and turning points of the lines as feature points, as shown in FIG. 7; In fact, the feature point detection section 23 first connects those points (end points, junction points and turning points) with lines, calculates the area of each cell surrounded by the lines, only chooses the cells whose size is less than a predetermined threshold, and then regards the points of those chosen cells as feature points. This method is for example disclosed in Jpn. Pat. Laid-open Publication No. 2006-207033.

After detecting the feature points (end points, junction points and turning points), the feature point detection section 23 generates position data D13 representing the positions of the detected feature points and then supplies the position data D13 to the positional difference calculation section 24. In addition, the feature point detection section 23 associates the position data D13 with the corresponding image data D12 (from which the position data D13 is produced) and then supplies them to the image combination processing section 25.

(2-4) Positional Difference Calculation Process

The positional difference calculation section 24 calculates a positional difference about a target first image (i.e. the image data D11), which the apparatus will process, and a previous-target second image (i.e. the image data D11), which the apparatus has processed before the first image: The positional difference calculation section 24 calculates a positional difference between a blood vessel line of the first image and a corresponding blood vessel line of the second image. The first image is also referred to as a "current image", while the second image, which has been processed before the current image, is also referred to as a "previous image".

The calculation method of the positional difference calculation section 24 is for example based on the so-called optical flow. For example, as shown in FIG. 8A, the positional difference calculation section 24 selects from the current image IM1 a certain point as an attention point AP and sets a m×n pixels block (also referred to as an "attention block") ABL around the attention point AP. The positional difference calculation section 24 calculates the brightness of the attention block ABL.

Figure 8B:
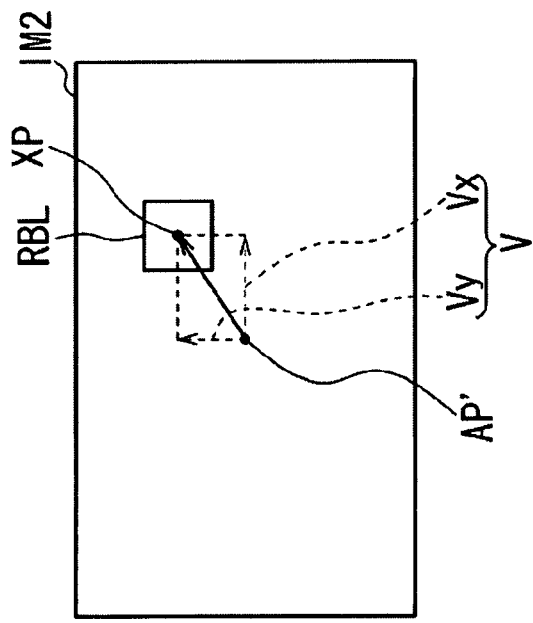
FIGS. 8A and 8B are schematic diagrams illustrating the process of positional difference calculation.
Figure 8A:
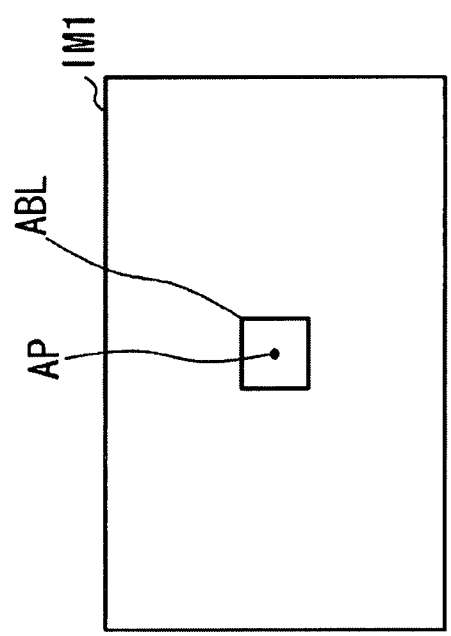

As shown in FIG. 8B, the positional difference calculation section 24 finds out, from the previous image IM2, a block RBL whose brightness value is the nearest to that of the attention block ABL and then regards the center of the block RBL as a corresponding point XP for the attention point AP.

The positional difference calculation section 24 calculates a position vector V (Vx, Vy) drawn from a position AP' (this position AP' of the previous image IM2 is the same as the attention point AP of the current image IM1) pointing to the corresponding point XP.

The positional difference calculation section 24 repeatedly performs the above process for a plurality of attention blocks of the current image IM1; each time it sets an attention block ABL, the positional difference calculation section 24 finds out a corresponding block RBL of the previous image IM2 and calculates a position vector drawn from a point AP' (whose position is the same as the center of the attention block) pointing to the center of the block RBL. The positional difference calculation section 24 subsequently calculates the average of the calculated position vectors (i.e. the average of the horizontal vector components Vx and vertical vector components Vy) as positional difference and then supplies it to the image combination processing section 25 as positional difference data D15.

In this embodiment, based on the position data D13, the positional difference calculation section 24 is designed to detect the feature points of blood vessel lines from the current image IM1 and specify those feature points as attention points AP. That is, the attention points AP are detected only from the blood vessel lines, not from all the pixels of the image IM1. This reduces the processing load of the positional difference calculation section 24 searching for blocks RBL.

Figure 9:
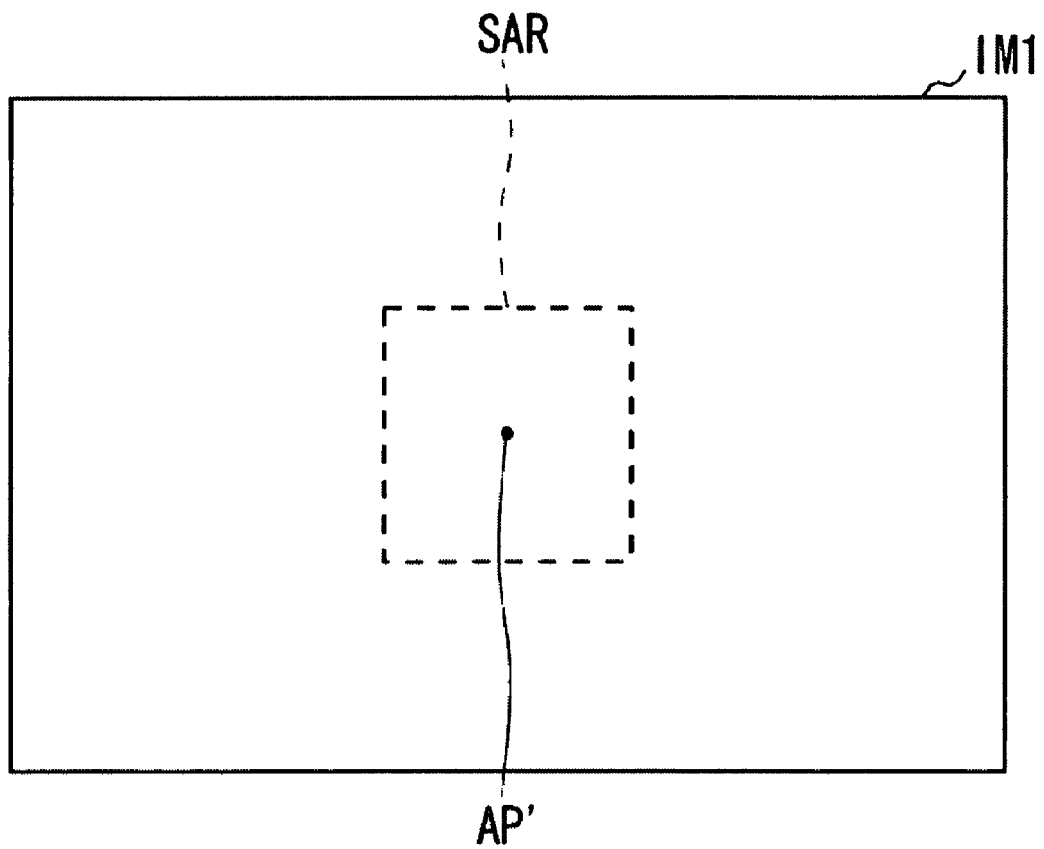
FIG. 9 is a schematic diagram illustrating a search area.

Before searching for a block RBL whose brightness value is the nearest to that of the attention block ABL, the positional difference calculation section 24 sets a search area SAR around the position AP' as shown in FIG. 9. The size of the search area SAR is a certain number of attention blocks combined. The positional difference calculation section 24 searches the search area SAR for a corresponding point. In this manner, the positional difference calculation section 24 only searches part of the previous image IM2, not the whole image IM2. This reduces the processing load of the positional difference calculation section 24 searching for blocks RBL.

Figure 10:
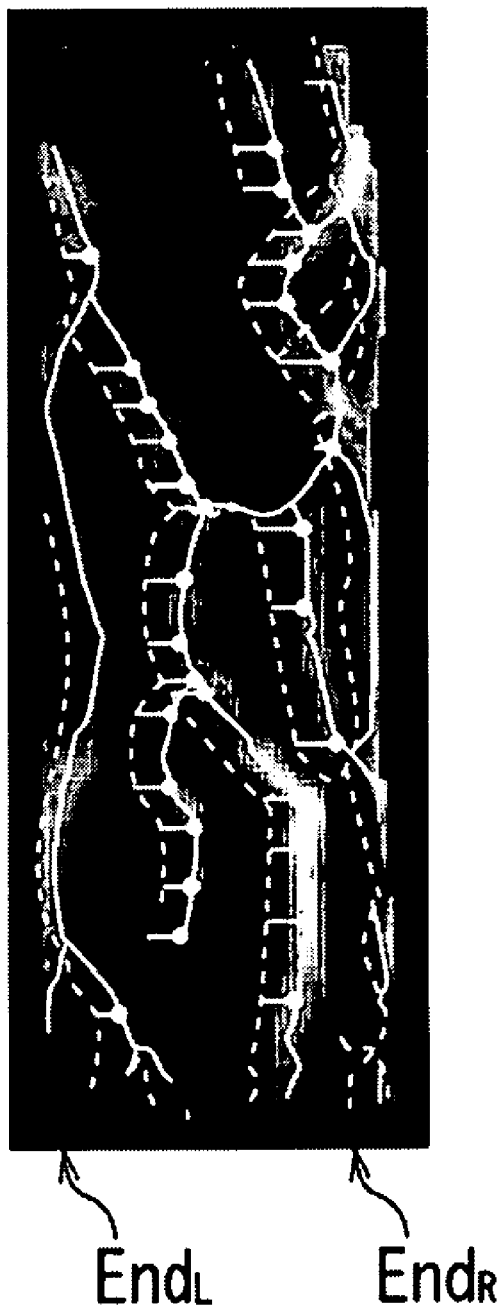
FIG. 10 is a schematic diagram illustrating positional differences.

FIG. 10 illustrates the positional differences between the current image and the previous image: Vertical lines are the blood vessel lines extracted by the pattern extraction section 22 from the current image; dots or points on the blood vessel lines are detected by the feature point detection section 23; and broken lines represent the blood vessel lines extracted by the pattern extraction section 22 from the previous image.

In this case, the positional differences are represented by horizontal lines between the vertical lines and the broken lines. Actually, the positional differences are calculated by averaging the position vectors or the horizontal lines.

It is evident from FIG. 10 that the calculated positional differences reflect the vertical difference between the current position of the finger and the previous position (which depends on how hard the user presses his/her finger against the surface or the like), as well as the horizontal difference between the current and previous positions.

In addition, according to the calculated positional differences, the positional difference calculation section 24 moves the search area SAR on the previous image IM2.

The following is one of examples of moving the search area SAR. When searching the previous image IM2 for a point corresponding to a feature point (i.e. an attention point AP) that exists on a blood vessel line of the current image IM1, the positional difference calculation section 24 uses a positional difference ($Vx_{\_AVE}$, $Vy_{\_AVE}$), which had been calculated when the previous image IM2 was regarded as a "current" image IM1. When this positional difference ($Vx_{\_AVE}$, $Vy_{\_AVE}$) is zero (which means that there is no positional difference), the positional difference calculation section 24 sets, on the previous image IM2, a search area SAR1 around a position AP'', which is the same location as the attention point AP (as shown in FIG. 11).

By the way, the positional difference ($Vx_{\_AVE}$, $Vy_{\_AVE}$), which had been calculated when the previous image IM2 was regarded as a "current" image IM1, is equivalent to a positional difference between a (k−1)th image and a (k−2)th image if a current image IM1, a previous image IM2 and a more previous image are a kth image, a (k−1)th image and a (k−2)th image respectively.

Figure 11:
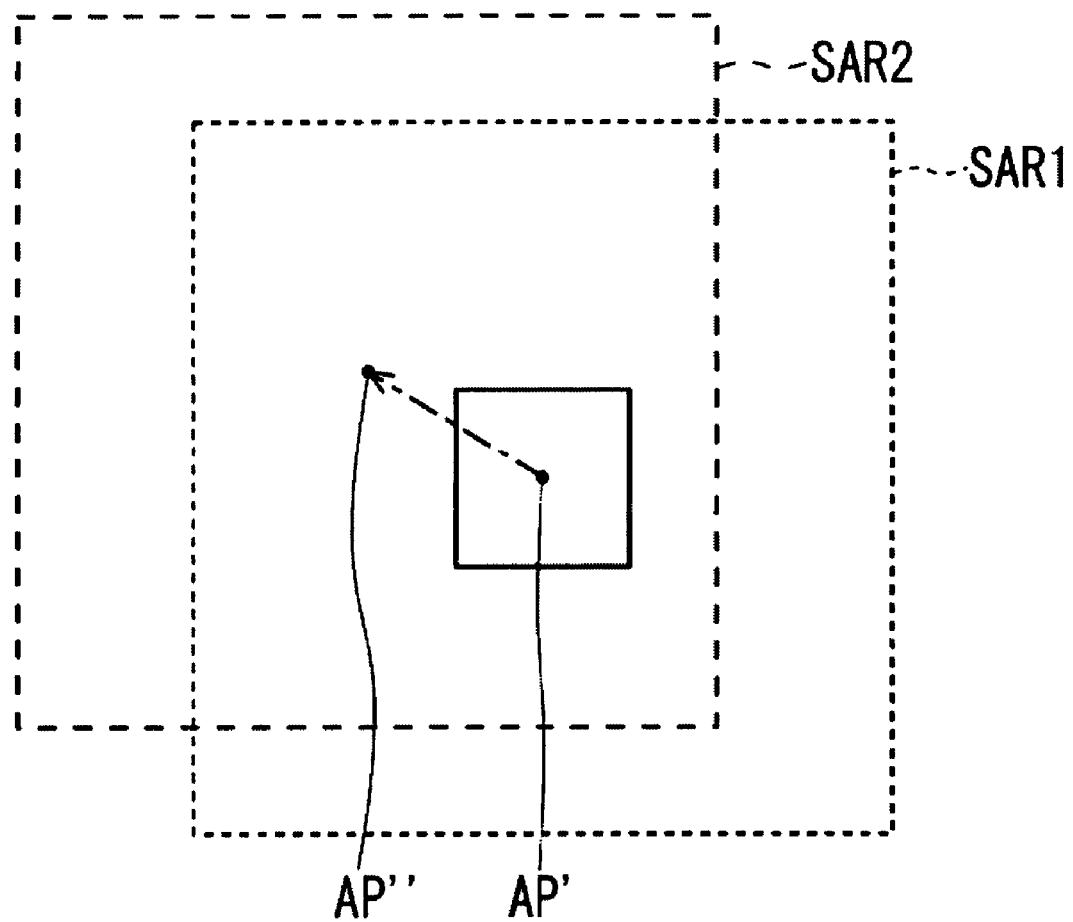
FIG. 11 is a schematic diagram illustrating the process of changing the position of a search area.

Whereas when the positional difference ($Vx_{\_AVE}$, $Vy_{\_AVE}$) is not zero (which means that there is some positional difference), the positional difference calculation section 24 moves the point AP'' by an amount equal to the positional difference and sets a search area SAR2 around it (i.e. a point AP''' in FIG. 11).

In that manner, the positional difference calculation section 24 is designed to move the center of a search area SAR according to the previously-calculated positional difference ($Vx_{\_AVE}$, $Vy_{\_AVE}$). Accordingly, the position of the search area SAR on the previous image IM2 can be changed.

That means that the positional difference calculation section 24 moves the search area SAR to compensate for the vertical difference between the current position of the finger and the previous position (which depends on how hard the user presses his/her finger against the surface or the like), as well as the horizontal difference between the current and previous positions.

By the way, in this embodiment, the calculation of positional differences is based on the image data D11, the data produced before the process of the pattern extraction section 22.

Figure 12:
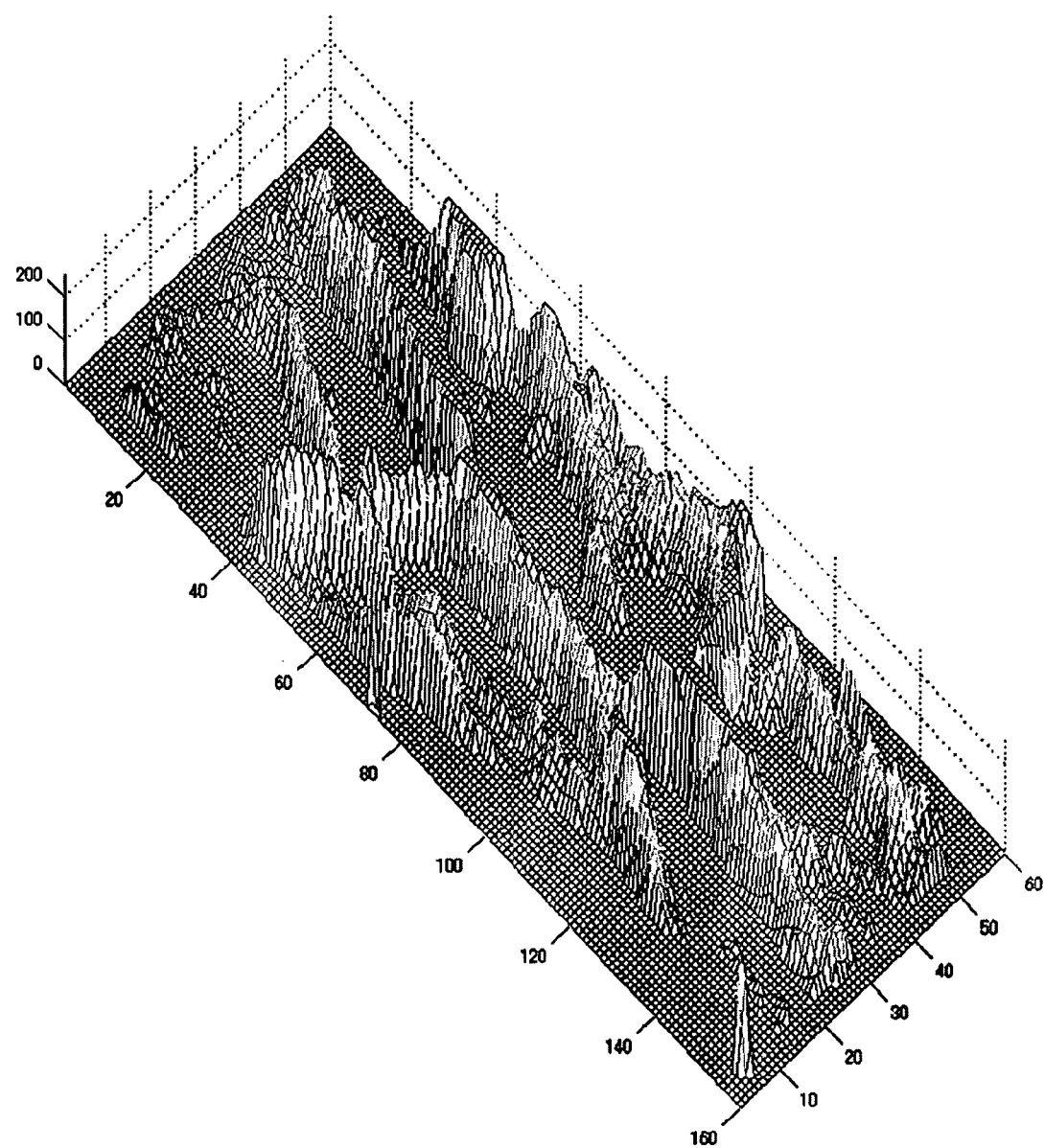
FIG. 12 is a schematic diagram illustrating the brightness of blood vessels after an embossment process.

This image data D11 clearly indicates a boundary between a blood vessel line and the other parts, as shown in FIGS. 5A and 5B. In addition, the brightness of the blood vessel lines on the image is regarded as information representing an actual three-dimensional (cross-sectional) shape of the blood vessels, as shown in FIG. 12. However, the image data D12 or D13 that has gone through the extraction process of the pattern extraction section 22 (binarization and thinning processes (FIG. 13)) presents rounded shapes of the blood vessels, as shown in FIGS. 14A and 14B.

If the image data D12 or D13 are used for the process of searching a previous image IM2 for a block whose brightness is the nearest to that of an attention block ABL of a current image IM1 (as shown in FIG. 8B), it is difficult for the positional difference calculation section 24 to find out an appropriate one because there may be many blocks of substantially the same brightness as the attention block ABL. In this case, the positional difference calculation section 24 may not be able to calculate a positional difference precisely.

That is why the positional difference calculation section 24 uses the image data D11 (which is data generated before the extraction process of the pattern extraction section 22) to calculate the positional differences.

On the other hand, an attention point AP of an attention block ABL of a current image IM1 is equivalent to a feature point detected from the image data D13 that has gone through the extraction process of the pattern extraction section 22.

The feature points represent a pattern of blood vessel lines. A feature point detected from an image that has not passed through the extraction process of the pattern extraction section 22 may not coincide with the one detected from the image data that has gone through the extraction process of the pattern extraction section 22. Accordingly, this kind of method (detecting a feature point from an image that has not passed through the extraction process) is not reliable.

Therefore, the positional difference calculation section 24 detects a feature point from the image data D13 that has passed through the pattern extraction section 22 and regards it as an attention point AP of an attention block ABL of a current image IM1.

(2-5) Image Clipping Process

Figure 15:
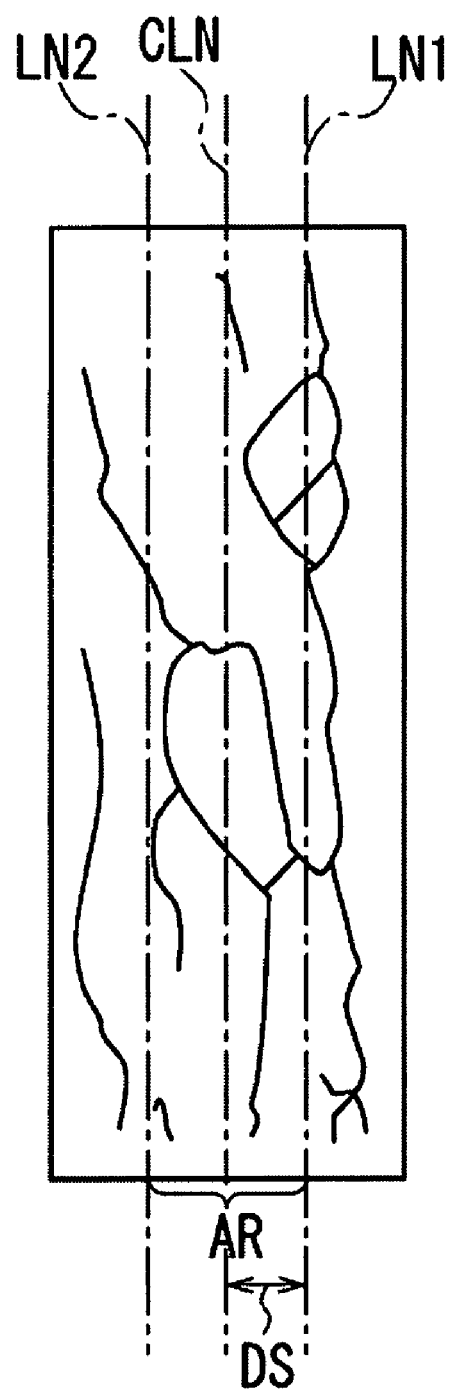
FIG. 15 is a schematic diagram illustrating how to clip a piece from an image.

An image clipping section 25A of the image combination processing section 25 cuts out from the input image (i.e. the image data D12) an effective area AR extending from a line LN1 to a line N2, each of which is a certain distance apart from a center line CLN that divides the image into equal two pieces in the direction of motion of the shooting object, as shown in FIG. 15.

A distance (represented by the number of pixels) DS between the center line CLN and one of the lines LN1 and LN2 is determined such that the ratio of a first motion distance to a second motion distance is less than one pixel: The first motion distance represents a distance that the shooting object has moved in the direction of motion with respect to the center of the image pickup surface while the second motion distance indicates a distance that shooting object has moved in the direction of motion with respect to a line beyond the center line.

Figure 16:
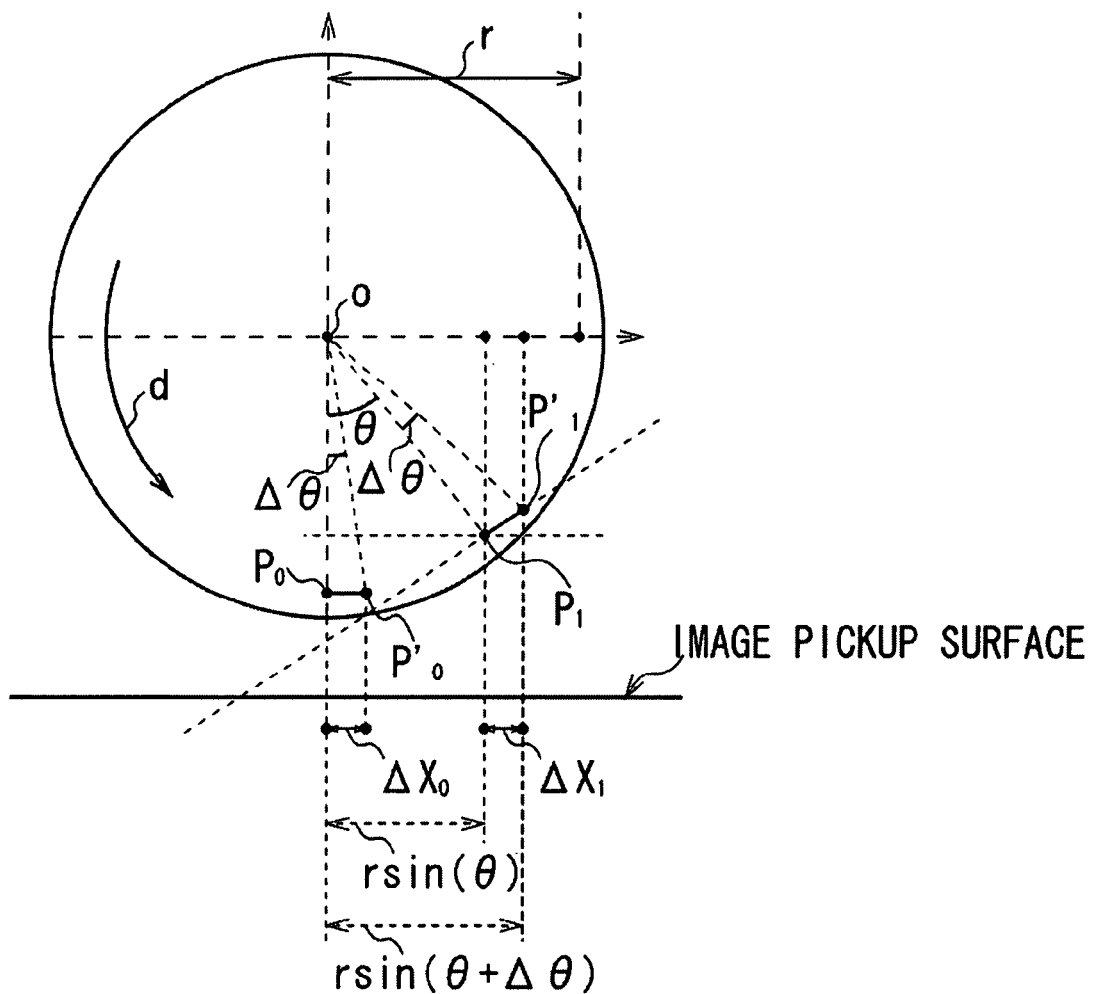
FIG. 16 is a schematic diagram illustrating a difference between a distance that a center part traveled and a distance that an end point traveled on an image-pickup surface.

Assume that, as shown in FIG. 16, a finger, which has blood vessels extending from the finger's center o by a distance r, is rotated around the center o in a rotation direction d by an angle of $\Delta\theta$. In this case, a point of a blood vessel on a cross-sectional plane that passes through the center o and perpendicularly crosses the image pickup surface is referred to as Po. When the finger is rotated in the rotation direction d by an angle of $\Delta\theta$ the point Po moves to a position P'o. At the same time, a point P1, which is in the rotation direction d making an angle of $\theta$ to the point Po, moves to a point P'1.

On the other hand, a distance $\Delta xo$ between the points Po and P'o and a distance $\Delta x1$ between the points P1 and P'1 on the image pickup surface are substantially the same if the shooting object (finger) has a flat surface. However, since the surface of the shooting object is curved, the distances $\Delta xo$ and $\Delta x1$ are different from each other.

If the rotation speed is substantially slow, the distance $\Delta xo$ is represented as follows:

$$\Delta x_0 = r\sin(\Delta\theta) \quad (1)$$
$$\cong r \cdot \Delta\theta$$

Similarly, the distance $\Delta x1$ is represented as follows:

$$\Delta x_1 = r\sin(\theta + \Delta\theta) - r\sin(\theta) \quad (2)$$
$$= r\{\sin(\theta)\cos(\Delta\theta) + \cos(\theta)\sin(\Delta\theta) - \sin(\theta)\}$$
$$\cong r\{\sin(\theta) \cdot 1 + \cos(\theta) \cdot \Delta\theta - \sin(\theta)\}$$
$$= r \cdot \Delta\theta \cdot \cos(\theta)$$

Based on the above equations (1) and (2), the ratio of $\Delta xo$ to $\Delta x1$ is:

$$\frac{\Delta x_1}{\Delta x_0} = \frac{r \cdot \Delta\theta \cdot \cos(\theta)}{r \cdot \Delta\theta} = \cos(\theta) \quad (3)$$

On the other hand, the angle $\theta$ between the points Po and P1 on the image pickup surface is represented as follows:

$$\theta = \arctan\left(\frac{r\sin(\theta)}{r}\right) \quad (4)$$

Accordingly, replacing "$\theta$" in the equation (3) with the equation (4) presents the ratio of $\Delta xo$ to $\Delta x1$ in the following manner:

$$\frac{\Delta x_1}{\Delta x_0} = \cos\left(\arctan\left(\frac{r\sin(\theta)}{r}\right)\right) \quad (5)$$

Assume that the difference between $\Delta xo$ and $\Delta x1$, an area ($r\sin(\theta)$) between the points Po and P1 on the image pickup surface, is allowed up to ten pixels. In this case, if the width of a direction corresponding to the motion direction on the image pickup surface is the same sixty pixels as the width of a finger, the distance r from the center o is about thirty pixels.

Accordingly, based on the equation (5), the ratio of $\Delta xo$ to $\Delta x1$ is 0.9388 . . . . That is, the difference between the motion distance $\Delta xo$ of the point Po and the motion distance $\Delta x1$ of the point P1 is less than one pixel. Therefore, they are regarded to be the same as the actual motion distance $\Delta\theta$. In this case, according to the equation (4), the angle $\theta$ (an angle Po-o-P1) is around 20 degrees.

Therefore, if an image to be clipped has the same width as a finger in pixels, the maximum size of the effective area AR will be one third of the width of the image to be clipped. In addition, an angle between the one end and the other end of the effective area AR with respect to the finger's center is up to 40 degrees. This prevents projection distortion of the effective area AR, which might often happen when a curved object is projected on a flat plane.

By the way, as shown in FIG. 10, the blood vessel lines indicated by broken lines and the blood vessel lines represented by the solid lines are substantially the same around the center area of the image. On the other hand, they are different from each other around the rim of the image. Accordingly, cutting out the effective area AR (FIG. 15) from the image prevents projection distortion.

Figure 17A:
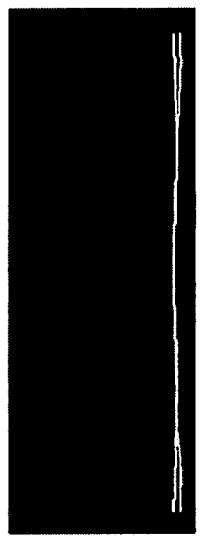
FIGS. 17A to 17C are schematic diagrams illustrating the effect of distortion correction.
Figure 17B:
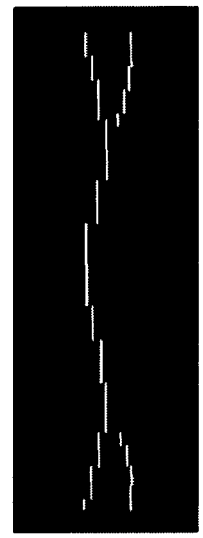
Figure 17C:
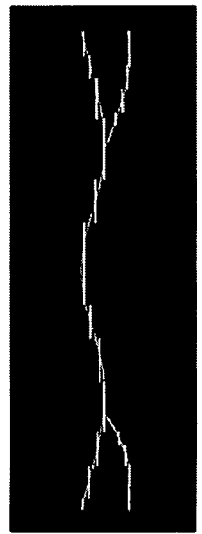

Instead of clipping the effective area AR from the input image, some apparatus might try to correct projection distortion by processing the rim of the image. However, processing the rim of the image (FIG. 17A) to correct distortion enhances the effect of aliasing as shown in FIG. 17B. In this manner, the smooth lines of blood vessels on the image ((FIG. 17A) are transformed into the jagged lines as shown in FIG. 17C.

Accordingly, the image clipping section 25A presents a more reliable image by clipping the effective area AR.

(2-6) Image Attachment Process

Figure 18:
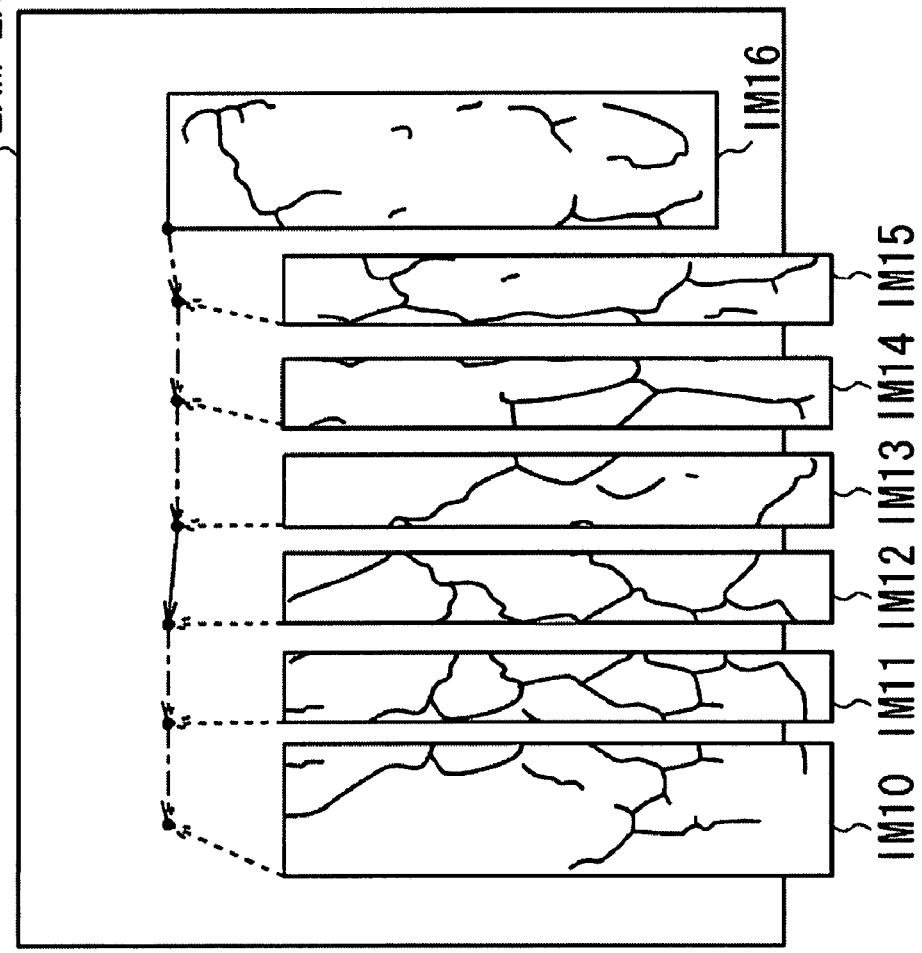
FIG. 18 is a schematic diagram illustrating an attachment process.

As shown in FIG. 18, an image attachment section 25B provides an expansion image EXM to which images are attached. The image attachment section 25B arranges the images IM10 to IM16 on the expansion image EXM: The position of the upper left end of each of the images IM10 to IM16 is for example determined according to a corresponding positional difference indicated by the position data D13.

In fact, the image attachment section 25 puts the first image IM10 on the left-side area of the expansion image EXM. By the way, in this embodiment, the image IM10 attached to the expansion image EXM includes both the effective area AR (FIG. 15) and the rim area because the image clipping section 25A did not cut off it.

After that, the image attachment section 25 puts the second and subsequent images IM11 to IM16 one at a time such that each image's reference point is positioned on a previously-attached image's reference point in accordance with the positional differences (i.e. the averages of the horizontal vector components Vx and vertical vector components Vy (FIG. 8B)). As a result, part of a blood vessel line of each image is overlapped with part of a blood vessel line of a previously-attached image.

By the way, the second and subsequent images IM11 to IM15, except the last one IM16, only include the effective areas AR (FIG. 15) as a result of the clipping process of the image clipping section 25A. The last image IM16 attached to the expansion image EXM includes both the effective area AR (FIG. 15) and the rim area in a similar way to the first image IM10.

Figure 19B:
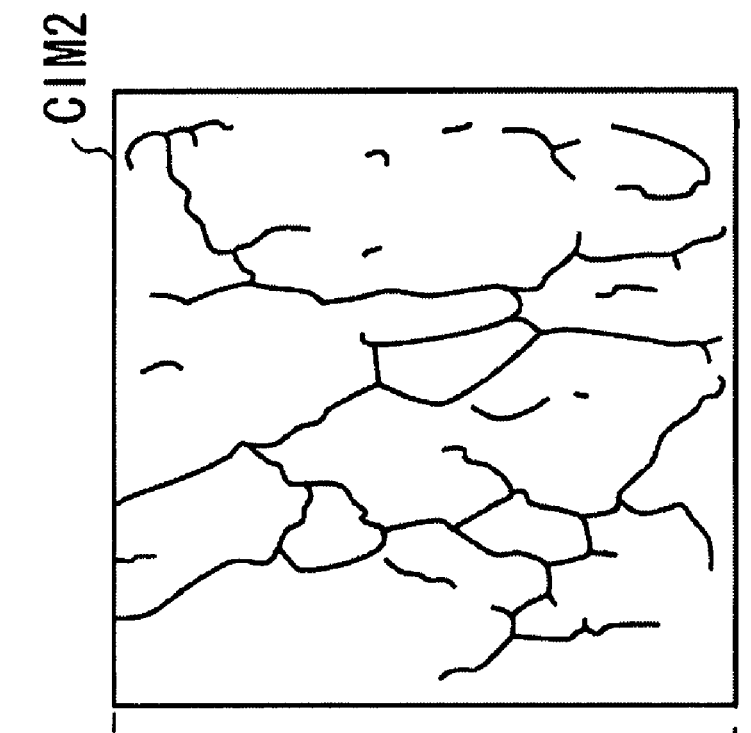
FIGS. 19A and 19B are schematic diagrams illustrating how to generate an image to be registered.
Figure 19A:
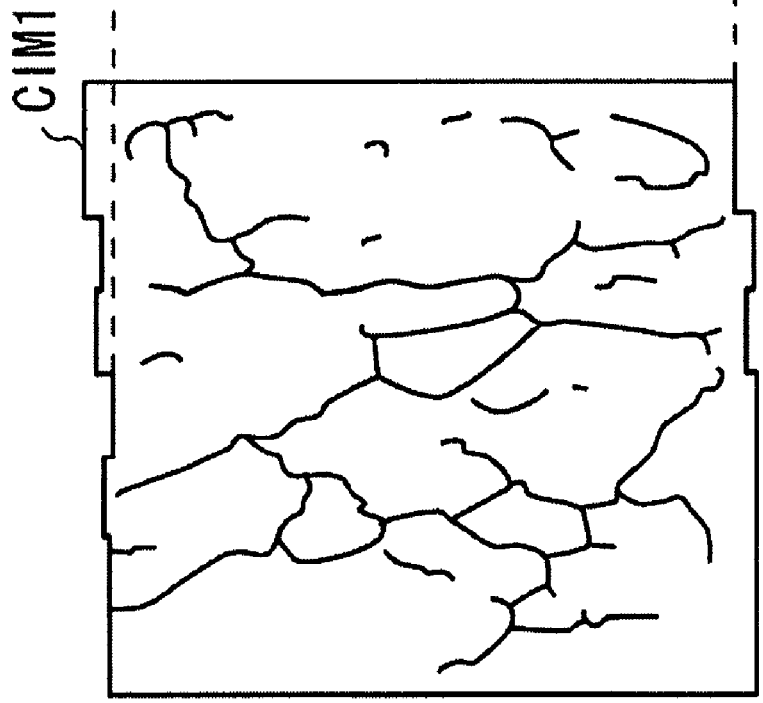

After attaching the last image IM16 to the expansion image EXM, the image attachment section 25B cuts off the protruding portions of the extension image EXM (or the image CIM1 [FIG. 19A]) to produce a rectangular image CIM2 for registration.

The image attachment section 25B subsequently recognizes the feature points of the blood vessel lines of the image CIM2 based on the position data D13 and then produces data to be registered (referred to as "registration data") by combining the data of the feature points, the data of the image CIM2 and the data that associates the feature points and the image CIM2.

In that manner, the control section 10 produces the registration data: The registration data includes an image on which blood vessels inside a finger are projected and data of the blood vessels' feature points.

(3) Registration Process

Figure 20:
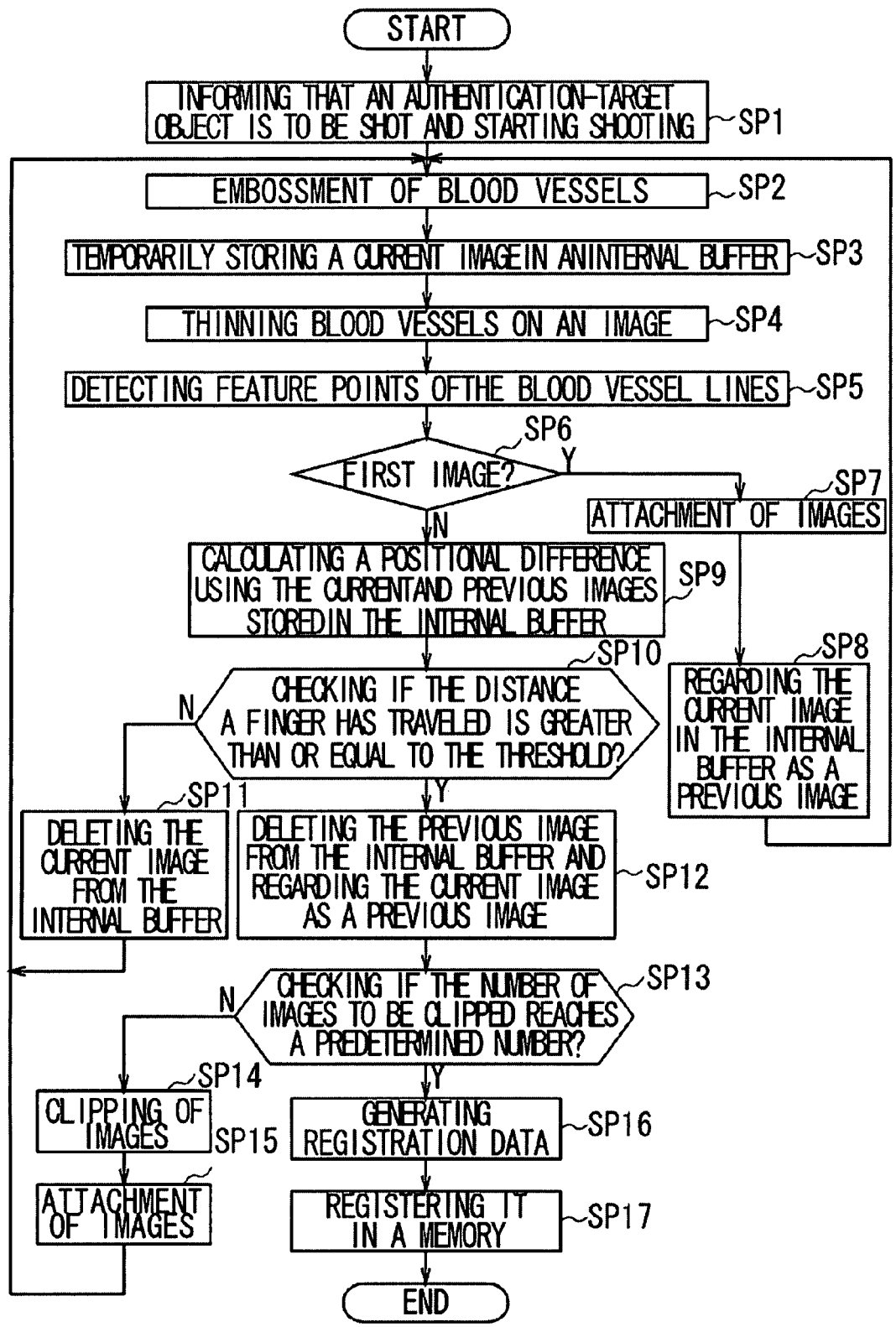
FIG. 20 is a flowchart illustrating a registration process.

FIG. 20 is a flowchart illustrating a registration process for the blood vessel registration mode. For ease of explanation, the apparatus does not reduce the number of images, which are sequentially supplied from the image pickup section 12.

When receiving the blood vessel registration mode execution command COM1, the control section 10 starts a registration process and proceeds to step SP1. At step SP1, the control section 10 controls the notification section 15 to send a user a message that he/she should put his/her finger on the shooting position and roll his/her finger on the surface. At the same time, the control section 10 controls the image pickup section 12 to start shooting.

When having received the image data supplied from the image pickup section 12, the control section 10 at step SP2 embosses a pattern of blood vessels on the image. At subsequent step SP3, the control section 10 temporarily stores the embossed image in an internal buffer memory as a current image.

At subsequent step SP4, the control section 10 transforms the embossed blood vessels into thin lines. At subsequent step SP5, the control section 10 detects endpoints, junction points and turning points of the thin lines as feature points.

If the current image is the first image supplied from the image pickup section 12, the control section 10 at step SP7 attaches the image of thin lines onto the left side area of the expansion image EXM. At subsequent step SP8, the control section 10 starts to regard the image, which is temporarily stored in the internal buffer, as a previous image and then returns to step SP2.

Whereas if the current image is not the first image supplied from the image pickup section 12, the control section 10 at step SP9 calculates a positional difference between the previous and current images based on the current image's feature points detected at steps SP4 and SP5: Both the previous and current images are temporarily stored in the internal buffer memory.

At step SP10, the control section 10 recognizes, from the averages of the horizontal vector components Vx and vertical vector components Vy (FIG. 8B) calculated at step SP9, a vector component that coincides with the direction of motion of the finger (i.e. the average of the vertical vector components Vy (FIG. 8B)) and then checks if it is greater than or equal to a predetermined threshold.

If the vector component is less than the threshold, the control section 10 determines that the finger is substantially not moving. In this case, at subsequent step SP11, the control section 10 deletes the current and previous embossed images from the internal buffer and then returns to step SP2.

Whereas if the vector component is greater than or equal to the threshold, the control section 10 at step SP12 deletes the previous embossed image from the internal buffer and then starts to regards the current embossed images, which is stored in the internal buffer, as a previous embossed image. The control section 10 subsequently proceeds to step SP13.

At step SP13, the control section 10 checks if the number of clipped images reaches a predetermined number. If not so, the control section 10 at step SP14 clips an effective area AR (FIG. 15) from the current embossed image. At subsequent step SP15, the control section 10 attaches the current embossed image onto the expansion image EXM (FIG. 18) such part of each blood vessel line of the current image is overlapped with a corresponding part of the previously-attached image in accordance with the positional difference calculated at step SP9. The control section 10 subsequently returns to step SP2.

Whereas if the number of clipped images has reached the predetermined number, the control section 10 at step SP16 attaches, in a similar way to that of step SP14, the current embossed image onto the expansion image EXM (FIG. 18) and then clips from the expansion image EXM or (i.e. the combined image CIM1 [FIG. 19A]) an image CIM2 for registration. The control section 10 subsequently produces the registration data including the image CIM2 and the data of feature points of the blood vessel lines of the image CIM2.

The control section 10 at subsequent step SP17 registers the registration data in the memory 13 (FIG. 1) and then ends the registration process.

In that manner, the control section 10 operates in the blood vessel registration mode.

(4) Authentication Mode

Following describes the authentication mode. When receiving the command of the authentication mode, the control section 10 (FIG. 1) enters the authentication mode. The control section 10 controls the notification section 15 to ask a user to put firmly his/her finger on the shooting position. The control section 10 also starts operating the image pickup section 12.

When the control section 10 has received image data from the image pickup element of the image pickup section 12 as a result of shooting, the control section 10 performs the processes of embossment, pattern extraction and feature point detection, which are the same as those of the blood vessel registration mode. In this manner, the control section 10 obtains the resultant image data and the data of feature points of the blood vessel lines of that image.

The control section 10 checks if the user is a legitimate person registered in the apparatus, by comparing the obtained feature points and image (also referred to as "reference points" and a "reference image" respectively) with the feature points and image of the registration data (also referred to as "registered points" and a "registered image" respectively).

If the control section 10 determines that the user is not legitimate, the control section 10 notifies the user accordingly through the display section 15a and the audio output section 15b. Whereas if the control section 10 determines that the user is legitimate, the control section 10 supplies data, which indicates the fact that the user is a legitimate person, to a device through the interface 14. When having received the data, the device performs a predetermined process, such as opening the door for the user or lifting restriction on an operation mode that was prohibited from being performed.

In that manner, the control section 10 operates in the authentication mode.

Figure 21:
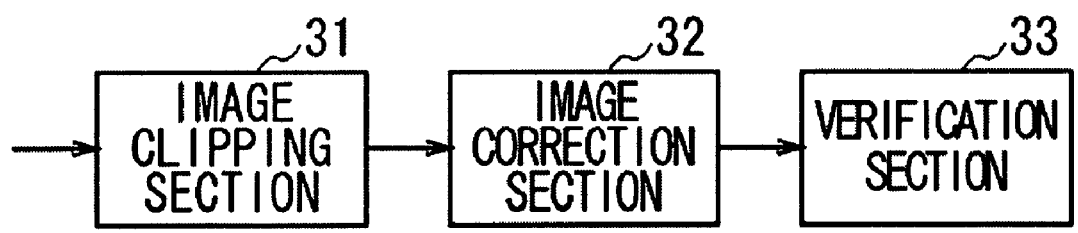
FIG. 21 is a block diagram illustrating the functional configuration of a control section (Authentication mode)

Following describes how the control section 10 obtains the reference points and reference image and how to determine the user is legitimate. Those processes can be represented by the functional blocks as shown in FIG. 21: an image clipping section 31, an image correction section 32 and a verification section 33.

The image clipping section 31 receives the reference image data and reference point data as a result of the processes of embossment, pattern extraction and feature point detection, which are the same as those of the blood vessel registration mode.

(4-1) Image Clipping Process

Figure 22:
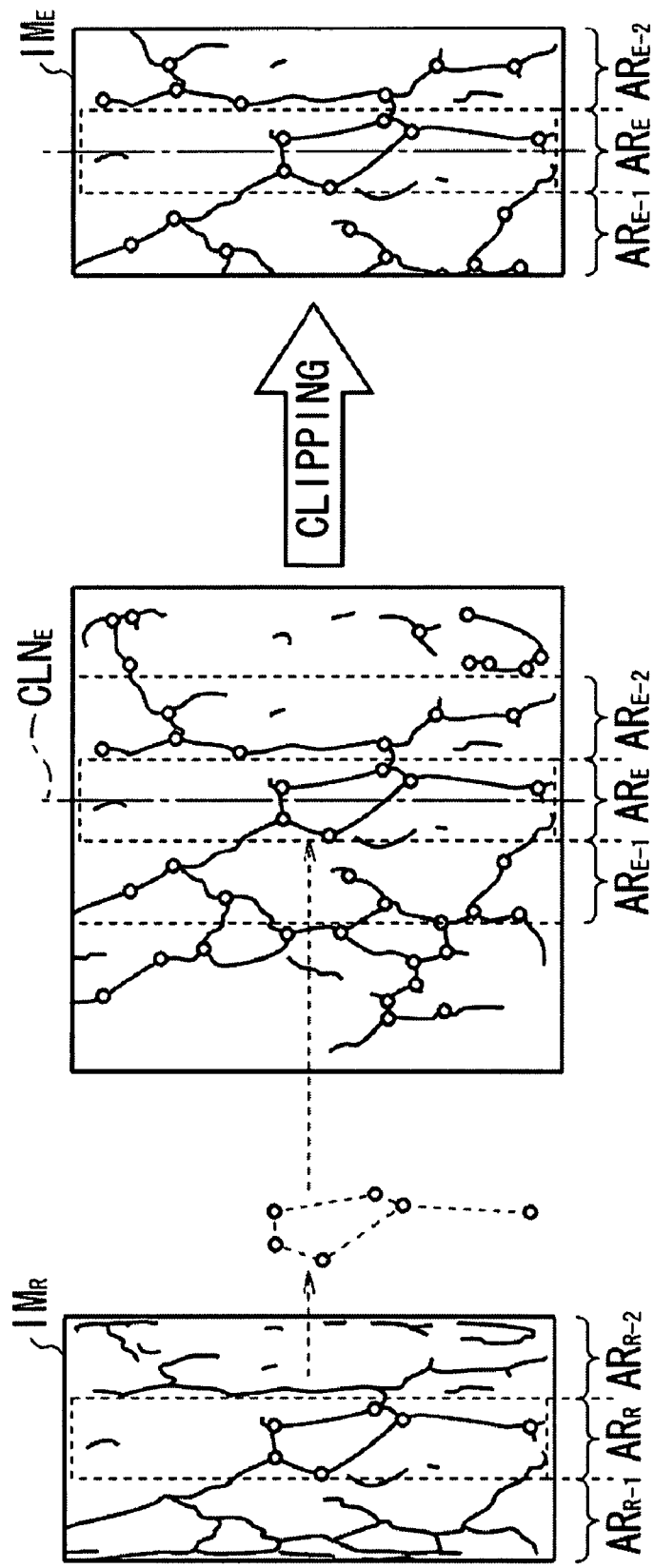
FIG. 22 is a schematic diagram illustrating how to find out and clip a verification-target area.

The image clipping section 31 searches the registered image for a part appropriate for being compared with the reference image. Specifically, as shown in FIG. 22, the image clipping section 31 recognizes a pattern of reference points in an effective area $AR_R$ of the reference image $IM_R$ and finds out an area of the registered image including a pattern of registered points that is substantially the same as or similar to the recognized pattern. This effective area $AR_R$ is the same size as that of the blood vessel registration mode.

That prevents projection distortion, which might often happen when a curved object is projected on a flat plane. Accordingly, the image clipping section 31 can precisely find out an area of the registered image including a pattern of registered points that is substantially the same as or similar to the recognized pattern (also referred to as a "search-target pattern").

If that pattern of registered points (which is substantially the same as or similar to the search-target pattern) is not detected, then this means that the blood vessel lines of the reference image $IM_R$ are different from those of the registered image CIM2. In this case, the apparatus notifies the user of the fact that the user is not legitimate, through the display section 15a and the audio output section 15b.

If that pattern is detected, the image clipping section 31 clips a verification-target image $IM_E$, which is the same size as the reference image $IM_R$ and is used for verification, from the registered image based on a vertical line $CLN_E$ that passes through a midpoint between left- and right-end registered points.

(4-2) Image Correction Process

The image correction section 32 corrects the side areas $AR_{E-1}$ and $AR_{E-2}$ of the verification-target image $IM_E$ (FIG. 22) such that the blood vessel lines of the side areas $AR_{E-1}$, and $AR_{E-2}$ become curved. By the way, between the side areas $AR_{E-1}$ and $AR_{E-2}$ is the effective area $AR_E$.

In this case, the registered image CIM2 (FIG. 19B) is a collection of images, each of which is a central part of the image (i.e. an effective area AR [FIG. 15]) whose projection distortion is relatively small. Accordingly, the effective area $AR_E$ and side areas $AR_{E-1}$, and $AR_{E-2}$ of the verification-target image $IM_E$, which was clipped from the registered image CIM2, has a low projection distortion.

On the other hand, side areas $AR_{R-1}$ and $AR_{R-2}$ of the reference image $IM_R$ have a relatively large projection distortion (Between the side areas $AR_{R-1}$ and $AR_{R-2}$ is the effective area $AR_R$). Accordingly, comparing the unadjusted verification-target image $IM_E$ with the reference image $IM_R$ may cause an improper result (such as failing to verify the user) due to the distinct difference between the side areas $AR_{E-1}$, and $AR_{R-1}$ and the side areas $AR_{E-2}$ and $AR_{R-2}$ in shape of blood vessel lines.

Figure 23C:
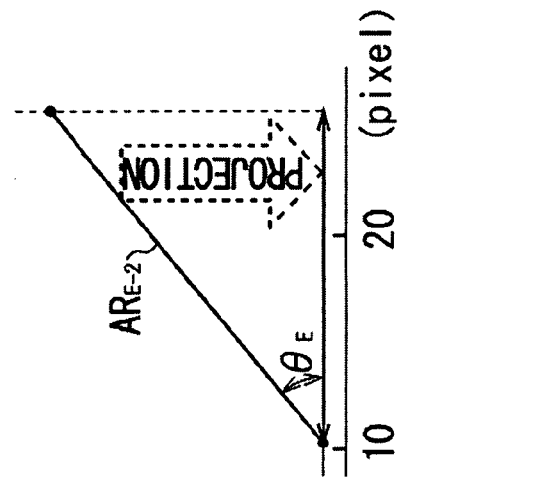
FIGS. 23A to 23C are schematic diagrams illustrating a correction process.
Figure 23B:
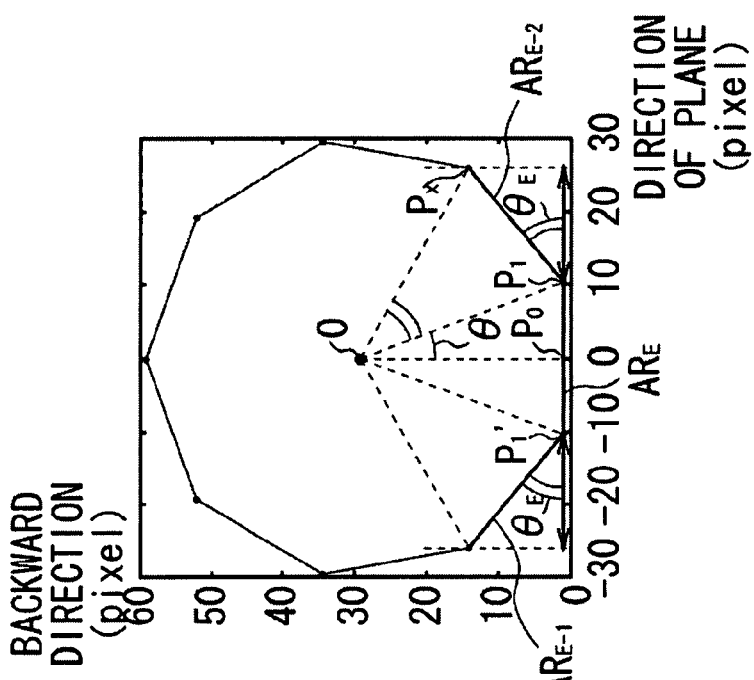
Figure 23A:
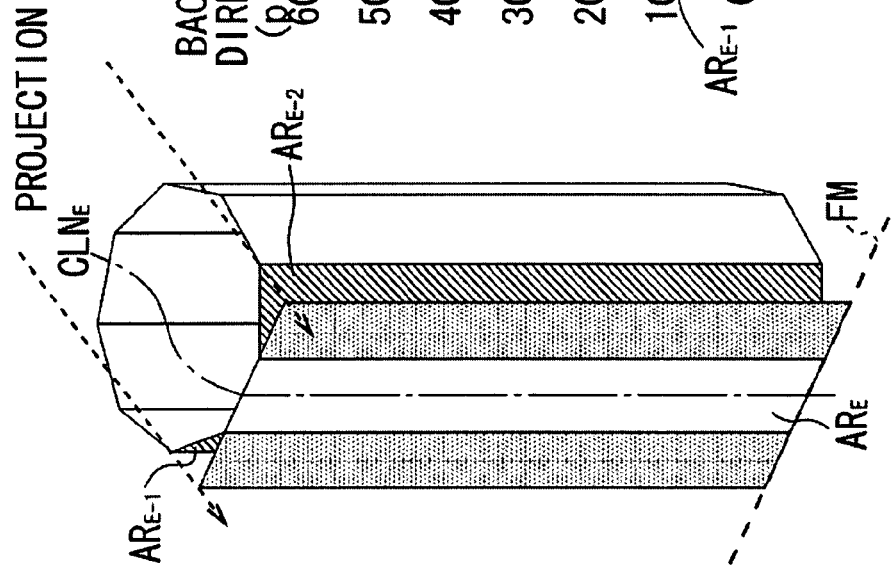

Accordingly, the image correction section 32 corrects the verification-target image $IM_E$ as shown in FIGS. 23A to 23C: the inclined side areas $AR_{E-1}$ and $AR_{E-2}$ are projected on a plane FM such that they are on the same level as the effective area $AR_E$, as shown in FIGS. 23A and 23B. In this case, the corrected side areas $AR_{E-1}$, and $AR_{E-2}$ are indicated by dotted-hatching in FIG. 23A and solid-line arrows in FIGS. 23B and 23C. The side areas $AR_{E-1}$ and $AR_{E-2}$ which were inclined backwardly from the endpoints $P_1$ and $P_1'$ of the effective area $AR_E$, made an angle of $\theta_E$ (FIGS. 23B and 23C).

By the way, in this case, an enneahedron in FIGS. 23A to 23C represents a finger. The width of the verification-target image $IM_E$ is 60 pixels while the width of the effective area AR is 20 pixels (which means a distance from one end of the effective area AR to the vertical line $CLN_E$ is 10 pixels).

In this case, according to the equation (4), an angle $P_o\text{-}o\text{-}P_1$, or $\theta$, is about 20 degrees. Accordingly, an angle $P_1\text{-}o\text{-}P_x$, or $\theta_E$, is about 40 degrees. In addition, the side areas $AR_{E-1}$ and $AR_{E-2}$ make an angle of around 40 degrees ($\theta_E$) with respect to the effective area $AR_E$.

Accordingly, the width of the projected blood vessel lines of the side area (indicated by dotted-hatching in FIG. 23A and solid-line arrows in FIGS. 23B and 23C) is calculated as follows: cos(40 degrees)×(the width of the inclined side area $AR_{E-1}$ (or $AR_{E-2}$)).

By the way, the reason that the apparatus does not correct the side areas $AR_{R-1}$ and $AR_{R-2}$ of the reference image $IM_R$ is the same as that of FIG. 18.

(4-3) Verification Process

The verification section 33 is designed to compare the verification-target image $IM_E$ with the reference image $IM_R$ in accordance with the cross correlation function. As a result, the verification section 33 obtains a cross correlation value. If the cross correlation value is greater than or equal to a predetermined threshold, the verification section 33 determines that the user is a legitimate person registered in the apparatus. Whereas if the cross correlation value is less than the threshold, the verification section 33 determines that the user is not legitimate.

In that manner, the control section 10 first obtains the registered image CIM2 by projecting the blood vessel pattern in the finger on the flat surface. The control section 10 then searches for the verification-target image $IM_E$ based on the feature points of the registered image CIM2 and reference image $IM_R$ and then checks if the user is legitimate or not by comparing the verification-target image $IM_E$ and the reference image $IM_R$.

(5) Authentication Process

Figure 24:
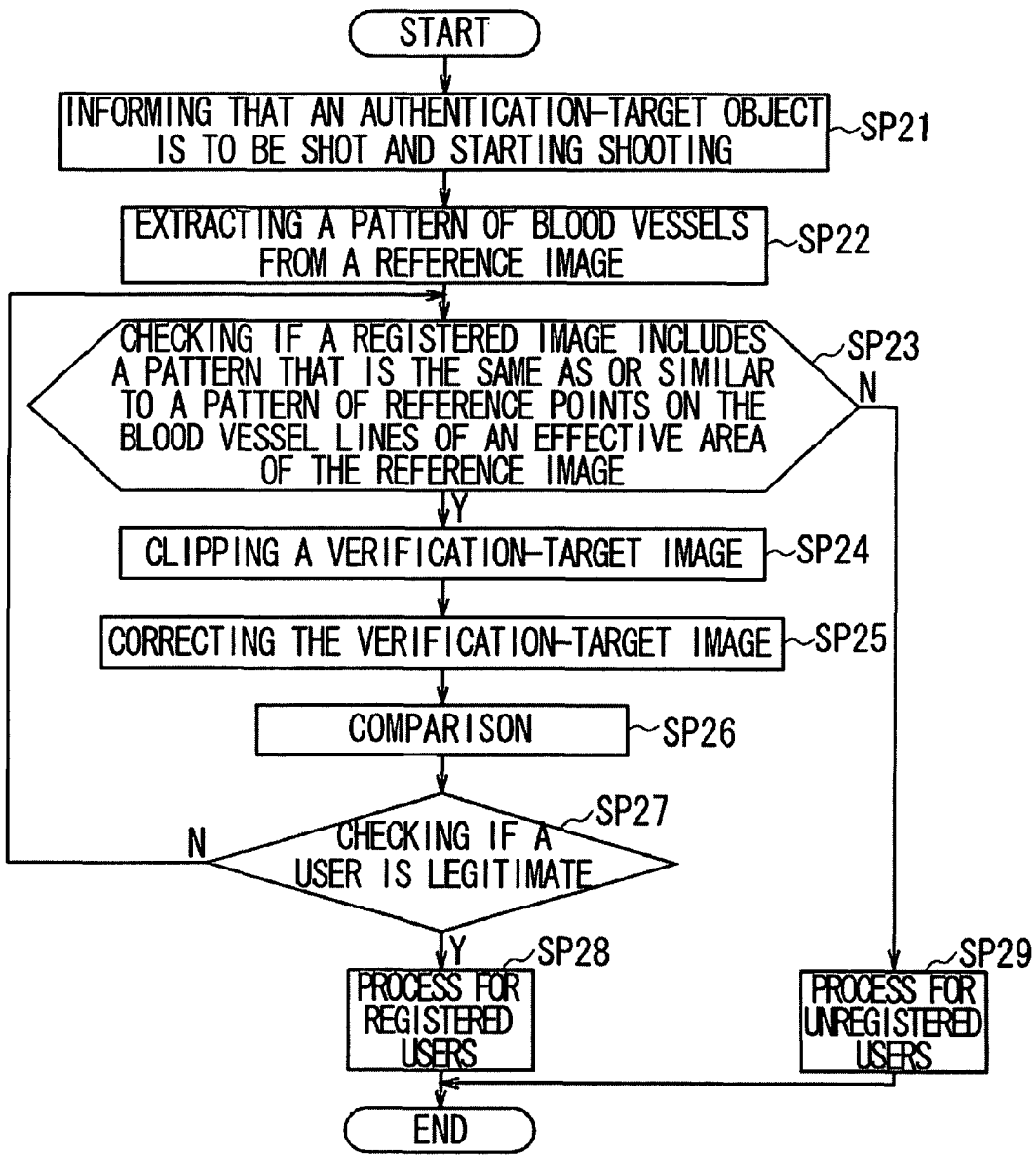
FIG. 24 is a flowchart illustrating an authentication process.

FIG. 24 is a flowchart illustrating an authentication process for the authentication mode.

When having received the authentication mode execution command COM2, the control section 10 starts an authentication process and then proceeds to step SP21. At step SP21, the control section 10 controls the notification section 15 to inform a user that he/she should put his/her finger on the shooting position such that the finger pad touches its surface and then roll his/her finger on the surface. In addition, the control section 10 controls the image pickup section 12 to start shooting.

When having received image data (data of reference images) from the image pickup section 12, the control section 10 at step SP22 performs, in the same way as the blood vessel registration mode, the processes of embossment, pattern extraction and feature point detection before performing a verification process.

At subsequent step SP23, the control section 10 recognizes a pattern of reference points of the effective area $AR_R$ of the reference image $IM_R$ as a search-target pattern. The control section 10 subsequently searches the registered image CIM2 for a pattern that is the same as or similar to the search-target pattern (FIG. 22).

If the control section 10 has successfully found a pattern of registered points that is the same as or similar to the search-target pattern, the control section 10 at step SP24 clips a verification-target image $IM_E$, which is the same size as the reference image $IM_R$ and is used for verification, from the registered image based on a vertical line $CLN_E$ that passes through a midpoint between left- and right-end registered points (FIG. 22). The control section 10 subsequently proceeds to step SP25.

At step SP25, the control section 10 corrects the verification-target image $IM_E$ as shown in FIGS. 23A to 23C: the inclined side areas $AR_{E-1}$ and $AR_{E-2}$ are projected on a plane FM such that they are on the same level as the effective area $AR_E$.

Subsequently, the control section 10 at step SP26 compares the verification-target image $IM_E$ (corrected at step SP15) with the reference image $IM_R$ (obtained at step SP22) in accordance with the cross correlation function. As a result, the control section 10 obtains a cross correlation value. At subsequent step SP27, the control section 10 checks if the user is legitimate or not.

If the cross correlation value is less than the threshold, the control section 10 determines that the user is not legitimate and then returns to step SP23 to retry the process.

Whereas if the cross correlation value is greater than or equal to the threshold, the control section 10 determines that the user is legitimate and then proceeds to step SP28. At step SP28, the control section 10 performs a process for legitimate users and then ends the authentication process.

On the other hand, if the control section 10 at step SP23 fails to find out a pattern of registered points that is the same as or similar to the search-target pattern, then this means that the registered image CIM2 (FIG. 19B) may not have a part whose cross correlation value with the reference image $IM_R$ is greater than or equal to the threshold. In this case, the control section 10 determines that the user is not legitimate. Subsequently, the control section 10 at step SP29 performs a process for unregistered users and then ends the authentication process.

In that manner, the control section 10 operates in the authentication mode.

(6) Operation and Effect

In the blood vessel registration mode, the positional difference calculation section 24 of the authentication apparatus 1 calculates a positional difference between a blood vessel line of a current image IM1 and a corresponding blood vessel line of a previous image IM2, which was supplied before the current image IM1 (FIGS. 8A and 8B). The image combination processing section 25 (FIG. 4) corrects the position of the current image IM1 to the previous image IM2 and combines the current image IM1 with the previous image IM2 such that part of each blood vessel line of the current image IM1 is overlapped with the corresponding part of the previous image IM2 (FIG. 18).

Accordingly, the authentication apparatus 1, whose fixed image pickup camera periodically takes images of a finger rolling on the shooting area, can compensate for the vertical difference between the finger's current and previous positions.

Accordingly, the authentication apparatus 1 can be easily mounted on a small device such as a mobile phone or personal digital assistants (PDA), since the apparatus 1 does not have to have any equipment into which a finger is inserted or the like.

An image of a finger, before being processed by the pattern extraction section 22, shows obscure outlines of blood vessels (FIG. 5A). Accordingly, there may be many blood vessel lines after making them thin (FIGS. 14A and 14B). This makes it difficult to calculate the horizontal and vertical difference of a finger.

In this embodiment, before calculating the horizontal and vertical difference, the pattern execution section 22 produces an image of clear outlines of the blood vessels. The authentication apparatus 1 therefore can precisely calculate a positional difference of blood vessels between the current and previous images.

By the way, before correcting the distortion of the images IM10 to IM16 (FIG. 18) of blood vessels, the apparatus may not be able to connect the images IM10 to IM16 appropriately.

On the other hand, if the apparatus is designed to use an effective area AR, it is desirable to make the width of the effective area AR as large as possible because combining many small effective areas AR increases the processing load. Accordingly, presetting the maximum limit of the effective area's width may help a device with a low power processor (such as a mobile phone or PDA) to operate smoothly.

In this embodiment, the maximum limit of the effective area's width is one third of the image from which a piece is clipped (Assume that the width of finger is substantially equal to that of the image) (FIG. 16). In this manner, the authentication apparatus 1 can set an appropriate width of the effective area AR to reduce the distortion while taking into consideration the effect of processing load.

In that manner, the authentication apparatus 1 does not have an image pickup camera that rotates around a shooting position (i.e. a finger) to take images of the finger. Instead, the authentication apparatus 1 has a fixed image pickup camera that periodically shoots a finger that is rolling on a surface around a shooting position. In addition, the authentication apparatus 1 can compensate for the horizontal and vertical positional difference of a finger between the current and previous image. Thus, the authentication apparatus 1 can be downsized and verify a user precisely.

(7) Other Embodiments

In the above-noted embodiment, a biometric trait to be verified is a blood vessel inside a body part. However, the present invention is not limited to this. For example, nerves, fingerprints or face can be used for verification. In some cases, the apparatus may not perform an embossment process.

Moreover, in the above-noted embodiment, a body part to be verified is a finger. However, the present invention is not limited to this. For example, a palm, a toe, an arm or an eye may be used for verification.

Furthermore, in the above-noted embodiment, the embossment section 21 uses a differentiation filter called Gaussian Filter. However, the present invention is not limited to this. The embossment section 21 can also use other differentiation filters, such as Log Filter or Contrast Filter. The embossment section 21 may include a spatial filter or the like before or after the differentiation filter to reduce noise.

Furthermore, in the above-noted embodiment, the feature point detection section 23 detects some of the junction points, endpoints and turning points as feature points. However, the present invention is not limited to this. The feature point detection section 23 may detect junction points, endpoints or turning points as feature points. Alternatively, the feature point detection section 23 may detect all of the junction points, endpoints and turning points as feature points.

Furthermore, in the above-noted embodiment, the feature point detection section 23 detects feature points after a pattern extraction process makes the blood vessels of the image a line-shaped pattern. However, the present invention is not limited to this. The feature point detection section 23 may detect feature points before processing the image of a finger or after an embossment process. The detailed description about detecting feature points is for example disclosed in Jpn. Pat. Laid-open Publication No. 2006-207033. However, the apparatus may use another differentiation filtering method called Harris Corner.

Furthermore, in the above-noted embodiment, the positional difference calculation section 24 detects from the previous image IM2 a block RBL whose brightness is the nearest to the attention block ABL of the current image IM2 and then regards a center point of the block RBL as a corresponding point XP (FIG. 9). However, the present invention is not limited to this. The positional difference calculation section 24 may find out from the previous image IM2 a block RBL whose brightness is a predetermined number less than the brightness of the attention block ABL and then regards a center point of the block RBL as a corresponding point XP. This can detect a corresponding point XP more precisely.

Furthermore, in the above-noted embodiment, the positional difference calculation section 24 moves the search area SAR on the previous image IM2 (FIG. 11). However, the present invention is not limited to this. Instead, the positional difference calculation section 24 may change the shape of the search area SAR on the previous image IM2.

In this case, the positional difference calculation section 24 calculates a variation between a positional difference, which was calculated when the previous image IM2 was regarded a "current image", and a previous positional difference: The calculated variation is represented by an x and y components ($Vx_{AVE}$, $Vy_{AVE}$) According to the calculated variation, the positional difference calculation section 24 adjusts the default position of the search area SAR.

Figure 25:
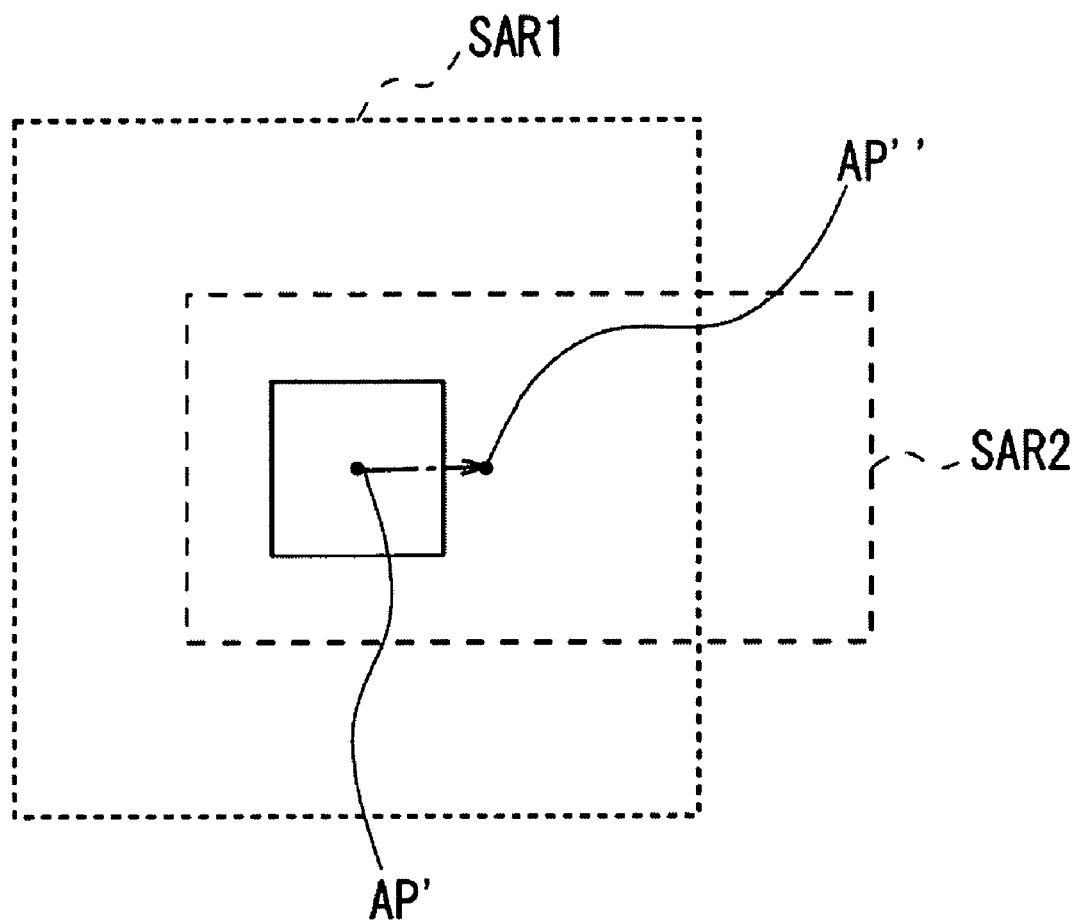
FIG. 25 is a schematic diagram illustrating how to change the shape of a search area.

As shown in FIG. 25 (The parts of FIG. 25 have been denoted by the same reference numerals and symbols as the corresponding parts of FIG. 11), if the calculated variation is zero, then this means that a finger is not moving. In this case the apparatus puts a search area SAR1 on the previous image IM2 around the same position AP' as AP. On the other hand, if there is some variation regarding the y component ($Vy_{AVE}$), then this means that a finger is rolling. In this case, the apparatus puts a search area SAR2 on the previous image IM2 such that its one side, which coincides with the direction that the finger is not moving, is minimized while the other side, which coincides with the direction that the finger is moving, is adjusted depending on how fast the finger is moving. In this manner, the search area SAR2 can effectively cover an area in which a finger is moving.

Furthermore, in the above-noted embodiment, the positional difference calculation section 24 calculates a positional difference in the following manner: the positional difference calculation section 24 detects a corresponding point XP on the previous image IM2, based on each point AP' or feature point detected from the current image IM1, and then calculates, as a positional difference, the average of the position vector drawn from a point AP' pointing to the corresponding point XP (i.e. the averages of the horizontal vector components Vx and vertical vector components Vy) (FIGS. 8A and 8B). However, the present invention is not limited to this. Alternatively, the positional difference may be a value (representative value) calculated from the position vectors in accordance with a statistical method, such as a maximum, minimum value or standard deviation of the position vector.

Furthermore, in the above-noted embodiment, the positional difference calculation section 24 determines a corresponding point XP based on each position AP' of all the feature points detected from the current image IM1 (FIGS. 8A and 8B). However, the present invention is not limited to this. Alternatively, the positional difference calculation section 24 may determine a corresponding point XP based on each position of the feature points inside the effective area AR (FIG. 15) of the current image IM1. This reduces the effect of distortion correction, which is reflected on the positional difference calculated. Accordingly, that allows the apparatus to calculate the positional difference more precisely.

Furthermore, in the above-noted embodiment, the image combination processing section 25 attached the first and last images to the expansion image EXM before clipping an effective area AR (FIG. 15) from them (FIG. 18). However, the present invention is not limited to this. The effective areas AR (FIG. 15), clipped from them, may be attached to the expansion image EXM.

Furthermore, the verification method of the above-noted embodiment is to compare the whole area of the reference image $IM_R$ with a corresponding area. However the present invention is not limited to this. Instead, the apparatus may compare only an effective area $AR_R$ of the reference image $IM_R$ with a corresponding area.

Furthermore, in the above-noted embodiment, the apparatus attaches images to the expansion image EXM after extracting patterns from them. However, the present invention is not limited to this. Instead, the apparatus may attach, after an embossment process, the images to the expansion image EXM and then extract patterns from them.

Furthermore, in the above-noted embodiment, the apparatus is designed to register the expansion image (CIM2 [FIG. 19B]) and the data of the feature points regarding the blood vessel lines on that image. However, the present invention is not limited to this. Alternatively, the apparatus may only register the expansion image. In this case, the apparatus in authentication mode may detect registered points as well as reference points: Accordingly, the apparatus can present the same effect as the above-noted embodiment.

Furthermore, in the above-noted embodiment, the apparatus is designed to register the expansion image (CIM2 [FIG. 19B]) and the data of the feature points regarding the blood vessel lines on that image. However, the present invention is not limited to this. Alternatively, the apparatus may only register the data of the feature points regarding the blood vessel lines on the expansion image (CIM2 [FIG. 19B]). This allows the apparatus not to perform a comparison process of comparing a reference image, which is input when a user is verified, with a verification-target image, which is clipped from a registered image, reducing the processing load of the apparatus.

Furthermore, in the above-noted embodiment, the apparatus operates in the blood vessel registration mode or authentication mode by executing programs stored in the ROM. However, the present invention is not limited to this. Those programs may be installed in the apparatus from program storage media, such as compact disc (CD), digital versatile disc (DVD) or semiconductor memories, or may be acquired from a program provision server via the Internet.

Furthermore, in the above-noted embodiment, the registration process and the authentication process are performed by the control section 10. However, the present invention is not limited to this. Part of those processes may be performed by a graphics work station.

Furthermore, in the above-noted embodiment, the authentication apparatus 1 is equipped with the image-pickup function, the verification function and the registration function. However, the present invention is not limited to this. One or some of the functions may be realized by another apparatus.

The above-noted method can be applied to biometric verification.

It should be understood by those skilled in the art that various modifications, combinations, sub-combinations and alterations may occur depending on design requirements and other factors insofar as they are within the scope of the appended claims or the equivalents thereof.

What is claimed is:

1. A registration apparatus comprising:
a control section including:
a processor,
an embossment section that is configured to emboss a physical trait, of an imaged object, on a first image of the imaged object,
a pattern extraction section that is configured to extract the physical trait as a line-shaped pattern,
a detection section that is configured to detect some or all of junction points, endpoints and turning points of the line-shaped pattern as feature points,
a calculation section that is configured to:
search a second image, upon which the physical trait has been embossed by the embossment section prior to embossing the physical trait on the first image, for a point corresponding to the position of each feature point detected from the first image, and
obtain a representative value of position vectors drawn from the positions to the corresponding points as a positional difference, wherein the positional difference is between part of the physical trait on the first image that is processed and the corresponding part of the physical trait on the second image that was processed earlier than the first image, the physical trait being used for verification; and
a connecting section that is configured to:
correct, in accordance with the calculated positional difference, the position of the first image such that part of the physical trait on the first image is overlapped with the corresponding part of the physical trait on the second image, and
connect the first corrected image to the second image; and
a registration section that is configured to register the connected image in a storage medium.

2. The registration apparatus according to claim 1, wherein the calculation section is further configured to search for the corresponding points inside a search area whose center is on the position of a feature point.

3. The registration apparatus according to claim 1, wherein the calculation section is further configured to search for the corresponding points inside a search area whose center is located using a previously calculated positional difference.

4. The registration apparatus according to claim 2, wherein the calculation section is further configured to change the shape of the search area if the positional difference is non-zero.

5. The registration apparatus according to claim 1, wherein the registration section is further configured to register the connected image and the feature points detected from the connected image.

6. A registration method by a control section, comprising a processor and a memory, the memory storing instructions that when executed cause the control section to perform the method, the method comprising:
embossing a physical trait, of an imaged object, on a first image of the imaged object;
extracting the physical trait as a line-shaped pattern;
detecting some or all of junction points, endpoints and turning points of the line-shaped pattern as feature points;
searching a second image, upon which the physical trait has been embossed by the embossment section prior to embossing the physical trait on the first image, for a point corresponding to the position of each feature point detected from the first image;
obtaining a representative value of position vectors drawn from the positions to the corresponding points as a positional difference, wherein the positional difference is between part of the physical trait on the first image that is processed and the corresponding part of the physical trait on the second image that was processed earlier than the first image, the physical trait being used for verification;
correcting, in accordance with the calculated positional difference, the position of the first image such that part of the physical trait on the first image is overlapped with the corresponding part of the physical trait on the second image;
connecting, by the processor, the corrected first image to the second image; and
registering the connected image in a storage medium.

7. A non-transitory computer-readable medium comprising program code being operable, when executed by a computer system, to cause the computer system to perform the method, the method comprising:
embossing a physical trait, of an imaged object, on a first image of the imaged object;
extracting the physical trait as a line-shaped pattern;
detecting some or all of junction points, endpoints and turning points of the line-shaped pattern as feature points;
searching a second image, upon which the physical trait has been embossed by the embossment section prior to embossing the physical trait on the first image, for a point corresponding to the position of each feature point detected from the first image;

obtaining a representative value of position vectors drawn from the positions to the corresponding points as a positional difference, wherein the positional difference is between part of the physical trait on the first image that is processed and the corresponding part of the physical trait on the second image that was processed earlier than the first image, the physical trait being used for verification;

correcting, in accordance with the calculated positional difference, the position of the first image such that part of the physical trait on the first image is overlapped with the corresponding part of the physical trait on the second image;

connecting the corrected first image to the second image; and registering the connected image in a storage medium.

\* \* \* \* \*